(12) United States Patent
Jung et al.

(10) Patent No.: US 8,823,910 B2
(45) Date of Patent: Sep. 2, 2014

(54) DISPLAY PANEL, METHOD OF MANUFACTURING THE SAME AND ALIGNMENT MASK FOR MANUFACTURING THE SAME

(75) Inventors: Jin-Soo Jung, Hwaseong-si (KR); Baek-Kyun Jeon, Yongin-si (KR); Jun-Woo Lee, Seongnam-si (KR); Hyun-Ku Ahn, Hwaseong-si (KR); Yong-Hwan Shin, Yongin-si (KR); Byoung-Hun Sung, Hwaseong-si (KR); Sung-Yi Kim, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 221 days.

(21) Appl. No.: 13/475,287

(22) Filed: May 18, 2012

(65) Prior Publication Data

US 2013/0050625 A1  Feb. 28, 2013

(30) Foreign Application Priority Data

Aug. 24, 2011  (KR) ........................ 10-2011-0084504

(51) Int. Cl.
*G02F 1/1337* (2006.01)
*B32B 3/02* (2006.01)

(52) U.S. Cl.
CPC ................ *B32B 3/02* (2013.01); *G02F 1/1337* (2013.01)
USPC ............. 349/128; 349/129; 349/136; 438/30; 428/192; 257/E33.012; 430/5

(58) Field of Classification Search
CPC ............................ G02F 1/1343; G02F 1/1333
USPC .......................................... 349/128, 129, 136
See application file for complete search history.

(56) References Cited

U.S. PATENT DOCUMENTS

| | | | | |
|---|---|---|---|---|
| 6,469,763 | B2 * | 10/2002 | Kim et al. | 349/124 |
| 6,856,368 | B2 * | 2/2005 | Terashita et al. | 349/129 |
| 7,133,099 | B2 * | 11/2006 | Yoshida et al. | 349/129 |
| 7,215,397 | B2 * | 5/2007 | Inoue et al. | 349/129 |
| 2004/0233365 | A1 * | 11/2004 | Yoshida et al. | 349/123 |
| 2009/0190058 | A1 * | 7/2009 | Jung et al. | 349/48 |
| 2009/0279034 | A1 * | 11/2009 | Shoraku et al. | 349/129 |
| 2009/0284703 | A1 * | 11/2009 | Shoraku et al. | 349/129 |
| 2011/0128487 | A1 * | 6/2011 | Kim | 349/123 |
| 2012/0026439 | A1 * | 2/2012 | Jung et al. | 349/110 |
| 2012/0194753 | A1 * | 8/2012 | Shin | 349/33 |

* cited by examiner

*Primary Examiner* — Edward Glick
*Assistant Examiner* — Sang V Nguyen
(74) *Attorney, Agent, or Firm* — Cantor Colburn LLP

(57) ABSTRACT

A display panel includes a lower substrate, an upper substrate and a liquid crystal layer. The liquid crystal layer includes a plurality of domains, a horizontal domain boundary texture area and a vertical domain boundary texture area. The domains are disposed in a matrix shape. The horizontal domain boundary texture area extends in a first direction in a boundary between the domains adjacent to each other in a second direction and has a slope of a liquid crystal slowly (e.g., less) inclined compared to that of the domains. The vertical domain boundary texture area extends in the second direction in a boundary between the domains adjacent to each other in the first direction and has a width larger than that of the horizontal domain boundary texture area.

19 Claims, 15 Drawing Sheets

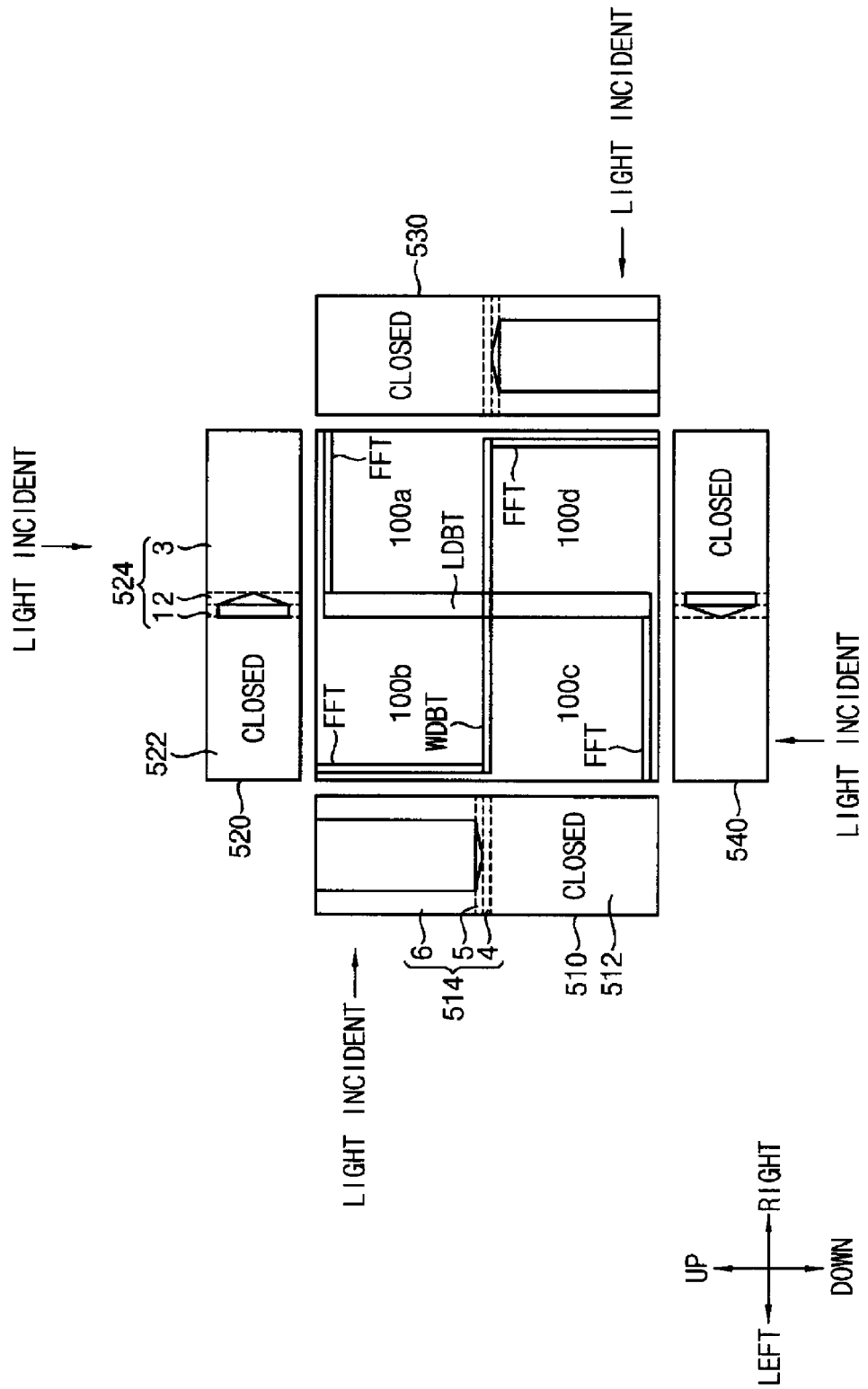

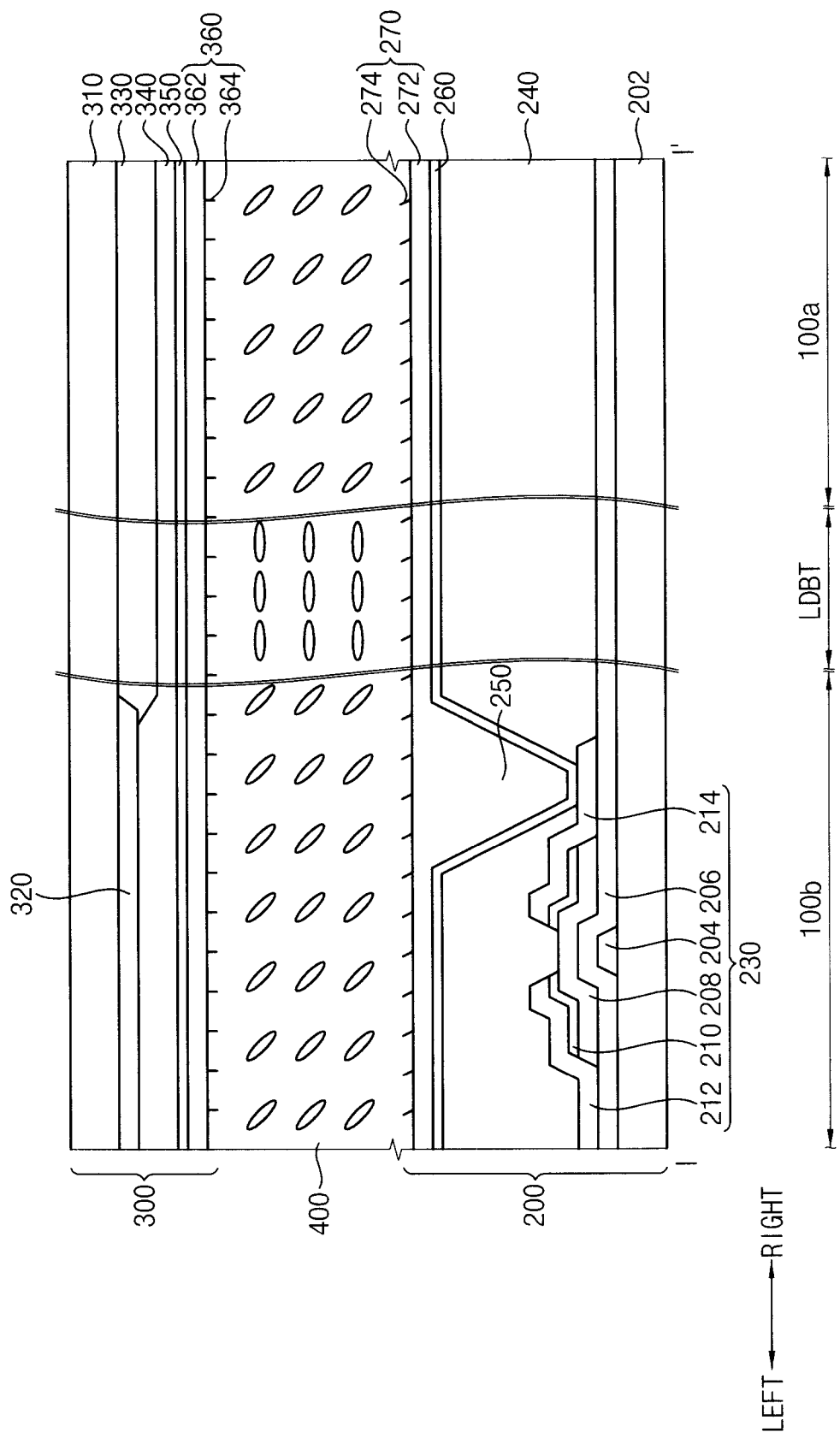

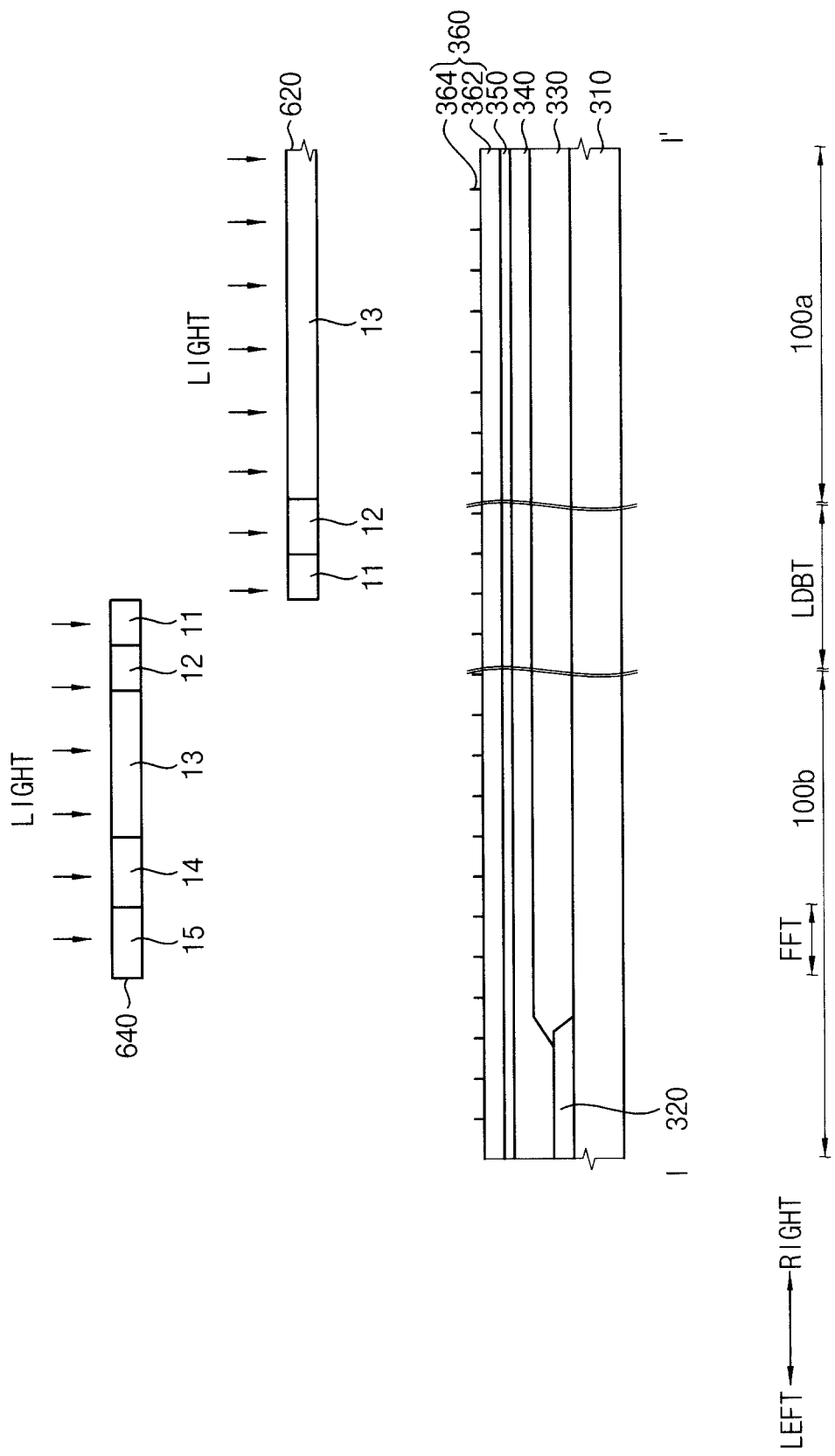

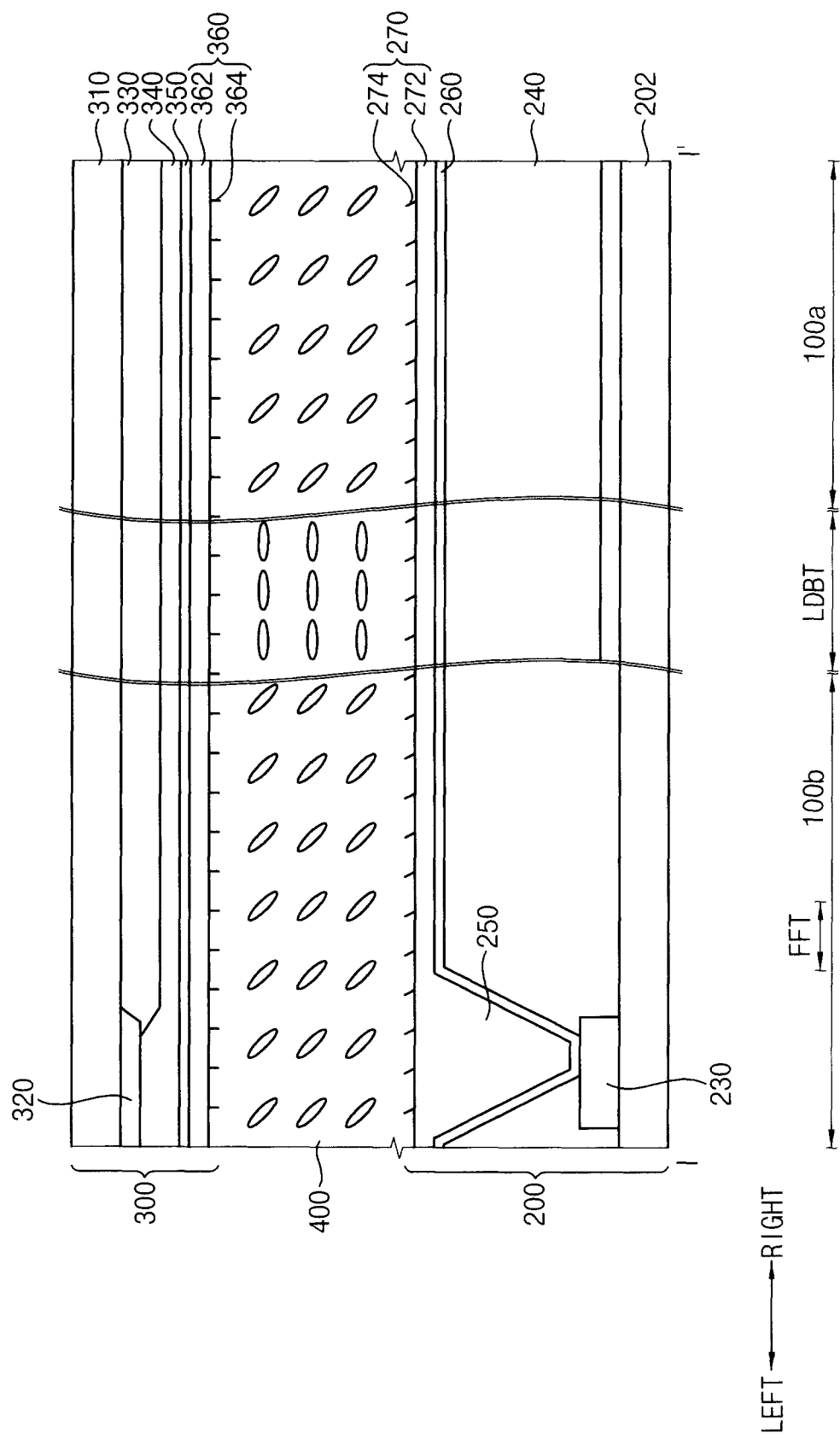

DISPLAY PANEL, METHOD OF MANUFACTURING THE SAME AND ALIGNMENT MASK FOR MANUFACTURING THE SAME

This application claims priority to Korean Patent Application No. 2011-0084504, filed on Aug. 24, 2011, and all the benefits accruing therefrom under 35 U.S.C. §119, the contents of which are herein incorporated by reference in their entireties.

BACKGROUND OF THE INVENTION

1. Field of the Invention

Exemplary embodiments of the invention relate to a display panel, a method of manufacturing the display panel and an alignment mask for manufacturing the display panel. More particularly, embodiments of the invention relate to a display panel including a liquid crystal, a method of manufacturing the display panel and an alignment mask for manufacturing the display panel.

2. Description of the Related Art

A liquid crystal display apparatus includes a lower substrate, an upper substrate and a liquid crystal layer interposed between the lower substrate and the upper substrate. An alignment of a liquid crystal in the liquid crystal layer is controlled so that the display apparatus displays an image. Thus, an alignment layer is formed in each of the lower substrate and the upper substrate.

A light alignment technique in which the liquid crystal is aligned by emitting a polarized ultraviolet ray to the alignment layer has been developing. When the polarized ultraviolet ray is incident into the alignment layer, a light reactor of the alignment layer forms a pretilted angle.

However, the light reactor has a dipole, and a direct current ("DC") is charged at the alignment layer. Thus, as the pretilted angle formed in the alignment layer increases, a black afterimage may be displayed on the display apparatus due to the remaining DC included in the alignment layer.

In addition, a side visibility along a horizontal direction is more critical than a side visibility along a vertical direction, and thus technology for enhancing the side visibility along the horizontal direction is required in manufacturing the display apparatus.

BRIEF SUMMARY OF THE INVENTION

Exemplary embodiments of the invention provide a display panel capable of enhancing display quality of a display apparatus.

Exemplary embodiments of the invention also provide a method of manufacturing the above-mentioned display panel.

Exemplary embodiments of the invention also provide an alignment mask for manufacturing the above-mentioned display panel.

According to an exemplary embodiment of the invention, a display panel includes a lower substrate, an upper substrate and a liquid crystal layer. The lower substrate includes a gate line extending in a first direction, a data line extending in a second direction substantially perpendicular to the first direction, a pixel electrode adjacent to the gate line and the data line, and a first alignment layer on the pixel electrode. The upper substrate faces the lower substrate and includes a common electrode forming an electric field with the pixel electrode, and a second alignment layer on the common electrode. The liquid crystal layer is interposed between the lower substrate and the upper substrate, has a liquid crystal, and includes a plurality of domains, a horizontal domain boundary texture area and a vertical domain boundary texture area. The domains are disposed in a matrix shape according to a slope of the liquid crystal inclined due to an alignment of the first alignment layer and the second alignment layer. The horizontal domain boundary texture area is extended in the first direction in a boundary between the domains adjacent to each other in the second direction and has a slope of the liquid crystal slowly (e.g., less) inclined compared to that of the domains. The vertical domain boundary texture area is extended in the second direction in a boundary between the domains adjacent to each other in the first direction and has a width larger than that of the horizontal domain boundary texture area, and has a slope of the liquid crystal slowly (e.g., less) inclined compared to that of the domains.

In one embodiment, the first alignment layer may have a pretilted angle in the first direction, the second alignment layer may have a pretilted angle in the second direction, and the pretilted angle of the second alignment layer may be less than the pretilted angle of the first alignment layer in the vertical domain boundary texture area.

In one embodiment, the pretilted angle of the second alignment layer in the vertical domain boundary texture area may be less than the pretilted angle of the second alignment layer in the domains.

In one embodiment, the pretilted angle of the first alignment layer in the horizontal domain boundary texture area may be larger than the pretilted angle of the first alignment layer in the domains.

In one embodiment, the pretilted angle of the first alignment layer may be substantially equal to the pretilted angle of the second alignment layer in the domains.

In one embodiment, the liquid crystal may form an angle of about 45 degrees with respect to an upper surface of the pixel electrode in the domains.

In one embodiment, the liquid crystal may form an angle less than about 45 degrees with respect to an upper surface of the pixel electrode in the vertical domain boundary texture area.

In one embodiment, the liquid crystal layer may further include an adjacent electric field texture area in which a texture is formed due to the liquid crystal disposed in a pixel area including the pixel electrode and a liquid crystal disposed in an adjacent pixel area, and a pretilted angle of the first alignment layer and a pretilted angle of the second alignment layer in the adjacent electric field texture area may be larger than the pretilted angle of the first alignment layer and the pretilted angle of the second alignment layer in the domains.

In one embodiment, the first alignment layer may have a pretilted angle in the second direction, the second alignment layer may have a pretilted angle in the first direction, and the pretilted angle of the first alignment layer may be less than the pretilted angle of the second alignment layer in the vertical domain boundary texture area.

In one embodiment, the pretilted angle of the first alignment layer in the vertical domain boundary texture area may be less than the pretilted angle of the first alignment layer in the domains.

According to another exemplary embodiment of the invention, there is provided a method of manufacturing a display panel. In the method, a gate line, a data line and a pixel electrode is formed on a first base substrate and a first alignment layer is formed on the pixel electrode, to form a lower substrate. The gate line extends in a first direction, a data line extends in a second direction substantially perpendicular to the first direction, and the pixel electrode is adjacent to the gate line and the data line. A common electrode is formed on a second base substrate and a second alignment layer is formed on the common electrode, to form an upper substrate. The common electrode and the pixel electrode form an electric field. A liquid crystal is interposed between the lower substrate and the upper substrate, a plurality of domains disposed in a matrix shape according to a slope of the liquid crystal inclined due to an alignment of the first alignment layer and the second alignment layer are formed, a horizontal domain boundary texture area is formed in the first direction in a boundary between the domains adjacent to each other in the second direction, and a vertical domain boundary texture area is formed in the second direction in a boundary between the domains adjacent to each other in the first direction, to form a liquid crystal layer. The horizontal domain boundary texture area has a slope of the liquid crystal slowly (e.g., less) inclined compared to that of the domains. The vertical domain boundary texture area has a width larger than that of the horizontal domain boundary texture area and has a slope of the liquid crystal slowly (e.g., less) inclined compared to that of the domains.

In one embodiment, the lower substrate may be formed by emitting light in the first direction to a first mask having an open area corresponding to the horizontal domain boundary texture area.

In one embodiment, the upper substrate may be formed by emitting the light in the second direction to a second mask having an area in which a closed rate corresponding to the vertical domain boundary texture area is larger than an open rate corresponding to the vertical domain boundary texture area.

In one embodiment, the upper substrate may be formed by emitting light in the first direction to a first mask having an open area corresponding to the horizontal domain boundary texture area.

In one embodiment, the lower substrate may be formed by emitting the light in the second direction to a second mask having an area in which a closed rate corresponding to the vertical domain boundary texture area is larger than an open rate corresponding to the vertical domain boundary texture area.

According to still another exemplary embodiment of the invention, an alignment mask includes a first mask and a second mask. The first mask aligns a liquid crystal interposed between lower and upper substrates of a display panel, divides a pixel area into a plurality of domains according to a slope of the liquid crystal and includes an open area corresponding to a horizontal domain boundary texture area in a domain boundary texture area. The horizontal domain boundary texture area is substantially parallel with a first direction in which a gate line extends and has a slope of the liquid crystal slowly (e.g., less) inclined compared to that of the domains. The second mask aligns the liquid crystal and includes an area in which a closed rate corresponding to a vertical domain boundary texture area in the domain boundary texture area is larger than an open rate corresponding to the vertical domain boundary texture area. The vertical domain boundary texture area is substantially parallel with a second direction in which a data line extends. The second direction is substantially perpendicular to the first direction.

In one embodiment, an open rate of the first mask corresponding to the horizontal domain boundary texture area may be about 100%.

In one embodiment, the open rate of the second mask corresponding to the vertical domain boundary texture area may be less than the open rate of the second mask corresponding to one of the domains.

In one embodiment, the open rate of a further area the second mask corresponding to a portion of the vertical domain boundary texture area may be about 100%.

In one embodiment, the display panel may further include an adjacent electric field texture area in which a texture is formed due to the liquid crystal disposed in the pixel area and a liquid crystal disposed in an adjacent pixel area, and the first mask and the second mask are open corresponding to the adjacent electric field texture area.

According to the invention, a width of a vertical domain boundary texture area in which a liquid crystal is slowly (e.g., less) inclined along a left and right direction substantially parallel with a gate line may be increased, and thus a side visibility of a display apparatus may be improved. In addition, a width of a horizontal domain boundary texture area in which the liquid crystal is slowly (e.g., less) inclined along an up and down direction substantially parallel with a data line may be decreased, and thus a black afterimage may be less displayed on the display apparatus. Thus, display quality of the display apparatus may be enhanced.

BRIEF DESCRIPTION OF THE DRAWINGS

The above and other features and advantages of the invention will become more apparent by describing in detailed exemplary embodiments thereof with reference to the accompanying drawings, in which:

FIG. 4 is a plan view illustrating an exemplary embodiment of an alignment mask for manufacturing the display panel of FIGS. 1 to 3;

FIGS. 5A to 5E are cross-sectional views illustrating an exemplary embodiment of a method of manufacturing the display panel of FIGS. 1 to 3 using the alignment mask of FIG. 4;

FIGS. 7A to 7E are cross-sectional views illustrating an exemplary embodiment of a method of manufacturing the display panel of FIGS. 1 to 3 using the alignment mask of FIG. 6.

DETAILED DESCRIPTION OF THE INVENTION

Figure 1:
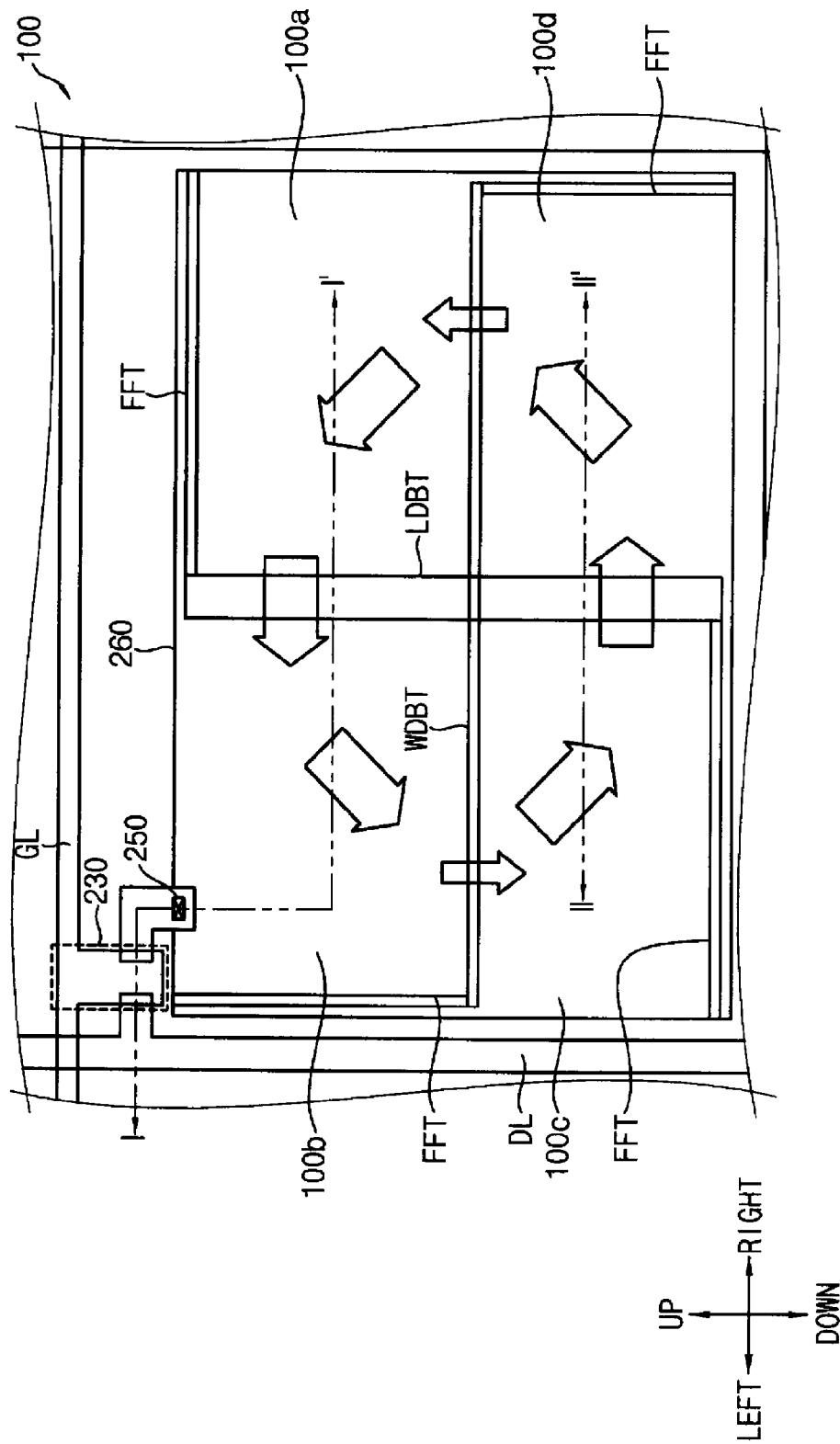
FIG. 1 is a plan view illustrating an exemplary embodiment of a display panel according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
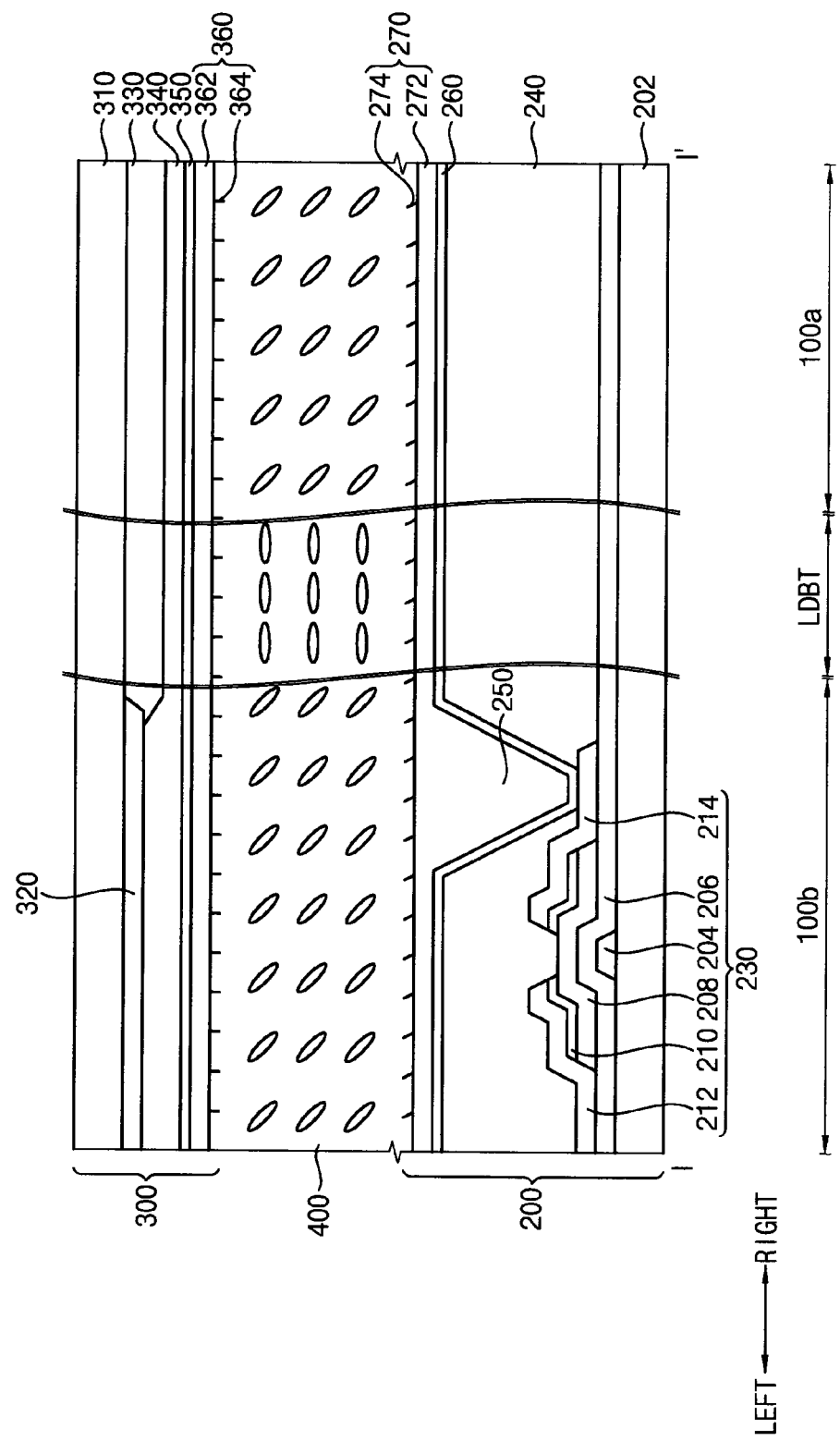
FIG. 2 is a cross-sectional view taken along line I-I' of FIG. 1.
Figure 3:
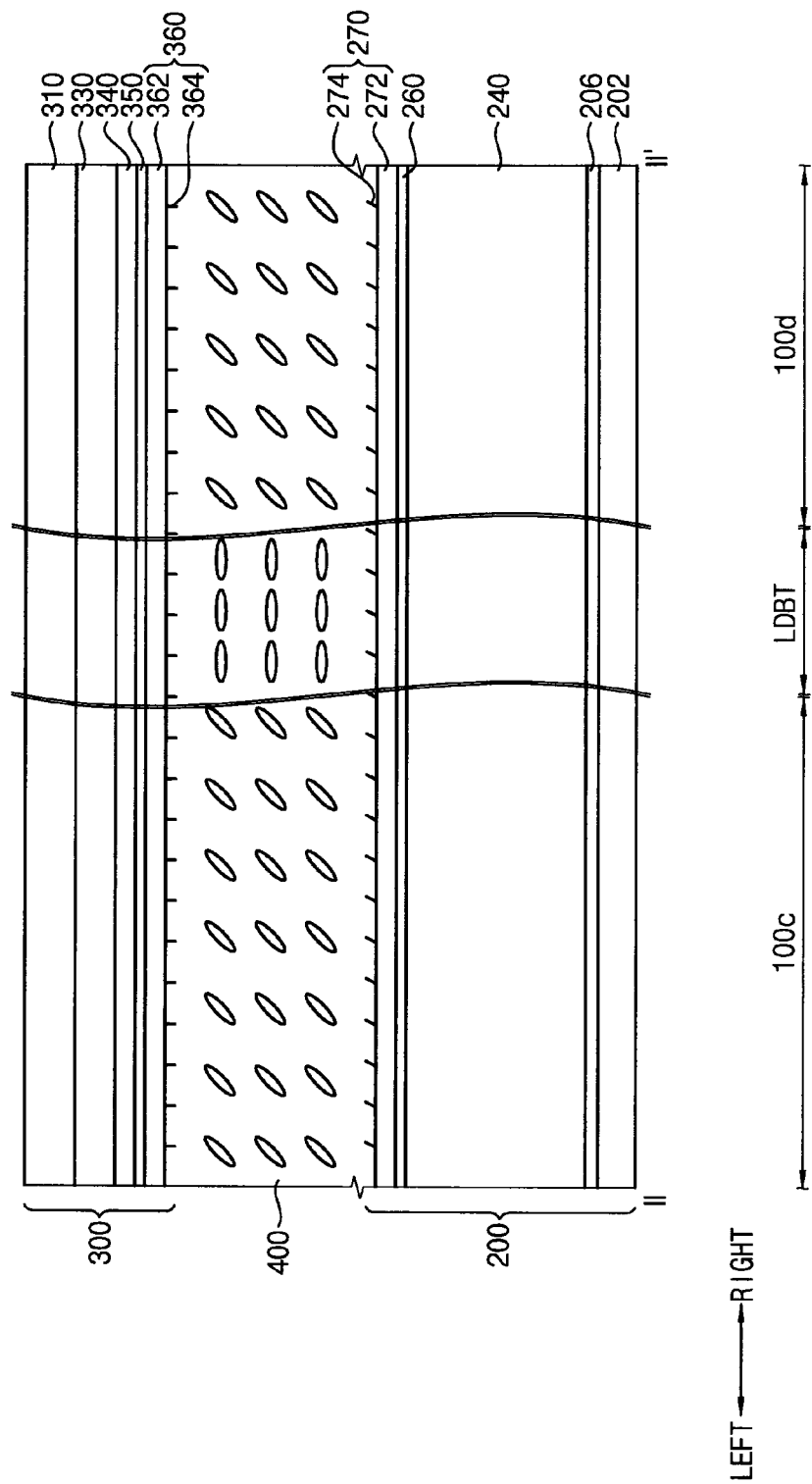
FIG. 3 is a cross-sectional view taken along line II-II' of FIG. 1.

FIG. 1 is a plan view illustrating an exemplary embodiment of a display panel according to the invention, FIG. 2 is a cross-sectional view taken along line I-I' of FIG. 1, and FIG. 3 is a cross-sectional view taken along line II-II' of FIG. 1.

Referring to FIGS. 1 to 3, the display panel 100 according to the exemplary embodiment includes a lower substrate 200, an upper substrate 300 and a liquid crystal layer 400.

A gate line GL longitudinally extending in a first direction which is a left and right direction in FIG. 1, and a data line DL longitudinally extending in a second direction which is an up and down direction in FIG. 1, are on the lower substrate 200. The second direction is substantially perpendicular to the first direction. Here, a plurality of the gate lines GL spaced apart from each other along the up and down direction and a plurality of the data lines DL spaced apart from each other along the left and right direction may be on the lower substrate 200.

In the exemplary embodiment, the lower substrate 200 includes a thin-film transistor ("TFT") 230 electrically connected with each of the gate lines GL and each of the data lines DL, a pixel area adjacent to each of the gate lines GL and each of the data lines DL, and a pixel electrode 260 electrically connected with the TFT 230. In one exemplary embodiment, for example, the pixel area may be defined by each of the gate lines GL and each of the data lines DL.

In the exemplary embodiment, for example, the lower substrate 200 may include a first base substrate 202, the gate lines GL, the data lines DL and the TFT 230 disposed on the first base substrate 202, an organic insulating layer 240 on the TFT 230, the pixel electrode 260 on the organic insulating layer 240 and electrically connected with a drain electrode 214 of the TFT 230 through a contact hole 250 which extends through a thickness of the organic insulating layer 240, and a first alignment layer 270 on the pixel electrode 260 and aligning a liquid crystal of the liquid crystal layer 400. The first alignment layer 270 may include a first alignment film 272, and a first light reactor 274 disposed on the first alignment film 272 and forming a pretilted angle by light incident from an outside. In one exemplary embodiment, for example, the first alignment layer 270 may have the pretilted angle in the first direction substantially parallel with the gate line GL.

The TFT 230 includes a gate electrode 204 on the first base substrate 202 and extended from the gate line GL, an insulating layer 206 on the gate electrode 204, an active layer 208 on the insulating layer 206, a separated ohmic-contact layer 210 on the active layer 208, a source electrode 212 on the ohmic-contact layer 210 and extended from the data line DL, and the drain electrode 214 on the ohmic-contact layer 210 and spaced apart from the source electrode 212.

The upper substrate 300 includes a second base substrate 310 facing the first base substrate 202, a light blocking portion 320 and a color filter 330 on the second base substrate 310, an over-coating layer 340 on the light blocking portion 320 and the color filter 330, a common electrode 350 on the over-coating layer 340 and forming an electric field with the pixel electrode 260, and a second alignment layer 360 on the common electrode 350 and aligning the liquid crystal of the liquid crystal layer 400. The second alignment layer 360 may include a second alignment film 362, and a second light reactor 364 disposed on the second alignment film 362 and forming a pretilted angle by the light incident from the outside. In one exemplary embodiment, for example, the second alignment layer 360 may have the pretilted angle in the second direction substantially parallel with the data line DL.

The liquid crystal layer 400 is disposed between the lower substrate 200 and the upper substrate 300 and includes the liquid crystal, and the liquid crystal layer 400 includes a plurality of domains. The domains are formed according to a slope of the liquid crystal in the pixel area adjacent to the gate and date lines GL and DL and including the pixel electrode 260. In the exemplary embodiment, for example, the liquid crystal layer 400 may include a first domain 100a in which the liquid crystal is inclined in an upper-left direction in a plan view, a second domain 100b in which the liquid crystal is inclined in a lower-left direction in the plan view, a third domain 100c in which the liquid crystal is inclined in a lower-right direction in the plan view, and a fourth domain 100d in which the liquid crystal is inclined in an upper-right direction in the plan view, as illustrated directions using block arrows in FIG. 1. The pretilted angle of the first alignment layer 270 and the pretilted angle of the second alignment layer 360 corresponding to the first to fourth domains 100a, 100b, 100c and 100d are substantially the same with each other, and thus the liquid crystal disposed in the first to fourth domains 100a, 100b, 100c and 100d has an angle of about 45 degrees with respect to an upper surface of the pixel electrode 260 due to a vector of the pretilted angle formed in the first alignment layer 270 and the pretilted angle formed in the second alignment layer 360.

In addition, the liquid crystal layer 400 includes a horizontal domain boundary texture area WDBT and a vertical domain boundary texture area LDBT at a boundary between the first to fourth domains 100a, 100b, 100c and 100d, and having a slope of the liquid crystal slowly (or less) inclined compared to that of the first to fourth domains 100a, 100b, 100c and 100d. The liquid crystal disposed in the horizontal domain boundary texture area WDBT and the vertical domain boundary texture area LDBT has an angle less than 45 degrees with respect to the upper surface of the pixel electrode 260.

The horizontal domain boundary texture area WDBT is at a boundary between the first domain 100a disposed in the upper-right of the pixel area and the fourth domain 100d disposed in the lower-right of the pixel area, and at a boundary between the second domain 100b disposed in the upper-left of the pixel area and the third domain 100c disposed in the lower-left of the pixel area. Thus, the horizontal domain boundary texture area WDBT is longitudinally extended in the first direction which is the left and right direction, at the boundary between the domains 100a, 100, 100c and 100d respectively adjacent to each other in the second direction which is the up and down direction.

The vertical domain boundary texture area LDBT is at a boundary between the first domain 100a disposed in the upper-right of the pixel area and the second domain 100b disposed in the upper-left of the pixel area, and at a boundary between the third domain 100c disposed in the lower-left of the pixel area and the fourth domain 100d disposed in the lower-right of the pixel area. Thus, the vertical domain boundary texture area LDBT is longitudinally extended in the second direction which is the up and down direction, at the boundary between the domains 100a, 100, 100c and 100d respectively adjacent to each other in the first direction which is the left and right direction. A width of the vertical domain boundary texture area LDBT is larger than that of the horizontal domain boundary texture area WDBT. The widths are taken in a direction perpendicular to the longitudinal direction of the respective domain boundary texture area. Thus, the liquid crystal having the angle less than about 45 degrees is disposed more widely in the left and right direction compared to the liquid crystal having the angle about 45 degrees in the up and down direction.

The liquid crystal layer 400 may include an adjacent electric field texture area FFT in which a texture is formed due to a first liquid crystal disposed in a first pixel area and a second liquid crystal disposed in a second pixel area adjacent to the first pixel area.

FIG. 4 is a plan view illustrating an exemplary embodiment of an alignment mask for manufacturing the display panel 100 of FIGS. 1 to 3.

Referring to FIGS. 1 to 4, the alignment mask includes a first mask 510, a second mask 520, a third mask 530 and a fourth mask 540. The first mask 510 scans the lower substrate 200 from the left direction to the right direction and the light is incident into the lower substrate 200, and the third mask 530 scans the lower substrate 200 from the right direction to the left direction and the light is incident into the lower substrate 200, and thus the pretilted angle is formed in the first alignment layer 270 of the lower substrate 200. The second mask 520 scans the upper substrate 300 from the up direction to the down direction and the light is incident into the upper substrate 300, and the fourth mask 540 scans the upper substrate 300 from the down direction to the up direction and the light is incident into the upper substrate 300, and thus the pretilted angle is formed in the second alignment layer 360 of the upper substrate 300. In one exemplary embodiment, for example, the light incident into the lower substrate 200 and the upper substrate 300 through the first to fourth masks 510, 520, 530 and 540 may be an ultraviolet ray.

The pretilted angle is formed in the first domain 100a, the horizontal domain boundary texture area WDBT adjacent to the first domain 100a, and the vertical domain boundary texture area LDBT adjacent to the first domain 100a using the first mask 510 and the second mask 520. The pretilted angle is formed in the second domain 100b, the horizontal domain boundary texture area WDBT adjacent to the second domain 100b, and the vertical domain boundary texture area LDBT adjacent to the second domain 100b using the first mask 510 and the fourth mask 540. The pretilted angle is formed in the third domain 100c, the horizontal domain boundary texture area WDBT adjacent to the third domain 100c, and the vertical domain boundary texture area LDBT adjacent to the third domain 100c using the third mask 530 and the fourth mask 540. The pretilted angle is formed in the fourth domain 100d, the horizontal domain boundary texture area WDBT adjacent to the fourth domain 100d, and the vertical domain boundary texture area LDBT adjacent to the fourth domain 100d using the third mask 530 and the second mask 520.

The first mask 510 includes a closed area 512 and an open area 514. The closed area 512 corresponds to the third domain 100c and the fourth domain 100d in which the pretilted angle is not formed by the first mask 510. In one exemplary embodiment, for example, the closed area 512 may include chrome (Cr) material.

The open area 514 includes a first area 4, a second area 5 and a third area 6. The first area 4 corresponds to the boundary between the first domain 100a and the fourth domain 100d. Thus, the first area 4 corresponds to the horizontal domain boundary texture area WDBT. The first area 4 is open and corresponds to the boundary between the first domain 100a and the fourth domain 100d. The third area 6 corresponds to the first domain 100d, and a closed rate of the third area 6 is larger than an open rate of the third area 6. Hereinafter, the closed rate means that a proportion of the closed area with respect to a total area including the closed and open areas, and the open rate means that a proportion of the open area with respect to the total area. The second area 5 is disposed between the first area 4 and the third area 6, and the second area 5 has an open rate between an open rate of the first area 4 and the open rate of the third area 6.

The second mask 520 includes a closed area 522 and an open area 524. The closed area 522 corresponds to the second domain 100b and the third domain 100c in which the pretilted angle is not formed by the second mask 520. In one exemplary embodiment, for example, the closed area 522 may include chrome material.

The open area 524 includes a first area 1, a second area 2 and a third area 3. The first area 1 corresponds to the boundary between the first domain 100a and the second domain 100b. Thus, the first area 1 corresponds to the vertical domain boundary texture area LDBT, and a closed rate of the first area 1 is larger than an open rate of the first area 1. The third area 3 is open and corresponds to the first domain 100a. The second area 2 is disposed between the first area 1 and the third area 3, and the second area 2 has an open rate between the open rate of the first area 1 and an open rate of the third area 3.

An amount of the light incident into the first domain 100a of the lower substrate 200 through the first mask 510 is substantially same as an amount of the light incident into the first domain 100a of the upper substrate 300 through the second mask 520. The open rate of the third area 6 in the first mask 510 is less than the open rate of the third area 3 in the second mask 520, and thus an exposing speed corresponding to the third area 6 in the first mask 510 is faster than that corresponding to the third area 3 in the second mask 520 based on a ratio of the open rate of the third area 3 in the second mask 520 to the open rate of the third area 6 in the first mask 510.

In one exemplary embodiment, for example, the open rate, an exposure quantity in millijoules (mJ), a width of the first mask 510 and the second mask 520 in micrometers (μm), and the pretilted angle formed by the first mask 510 and the second mask 520 may be shown in Table 1.

TABLE 1

| classification | | open rate of mask | exposure quantity | width | pretilted angle |
|---|---|---|---|---|---|
| second mask 520 | first area 1 | 30% (0~40%) | 1.8 mJ | 6.5 μm ± 1.5 μm | less than 0.7 degrees |
| | second area 2 | between 1 & 3 | between 1 & 3 | 6.5 μm ± 1.5 μm | between 1 & 3 |
| | third area 3 | 100% | 6 mJ | ½ Pixel − (1 + 2) | 1.2 degrees (±0.3 degrees) |
| first mask | first area 4 | 100% | 20 mJ | 6.5 μm ± 1.5 μm | 2.0 degrees (±0.3 degrees) |
| | second area 5 | between 4 & 6 | between 4 & 6 | 6.5 μm ± 1.5 μm | between 4 & 6 |
| | third area 6 | 30% (~40%) | 6 mJ | ½ Pixel − (4 + 5) | 1.2 degrees (±0.3 degrees) |

The open rate of the first area 1 in the second mask 520 may be about 30%, the exposure quantity of the first area 1 may be about 1.8 mJ, the width in the left and right direction of the first area 1 may be about 6.5 μm, and the first area 1 may form the pretilted angle less than about 0.7 degrees in the second alignment layer 360 in the vertical domain boundary texture area LDBT which is the boundary between the first domain 100a and the second domain 100b.

The open rate of the third area 3 in the second mask 520 may be about 100%, the exposure quantity of the third area 3 may be about 6 mJ, the width of the third area 3 in the left and right direction may be calculated as subtracting the width of the first area 1 and the width of the second area 2 from the half-width of the pixel area, and the third area 3 may form the pretilted angle of about 1.2 degrees in the second alignment layer 360 in the first domain 100a.

The open rate of the second area 2 in the second mask 520 may be between the open rate of the first area 1 and the open rate of the third area 3. Thus, the open rate of the second area 2 may be about 30% to about 100%, and for example, the open rate of the second area 2 may be about 60%. The exposure quantity of the second area 2 may be between the exposure quantity of the first area 1 and the exposure quantity of the third area 3. Thus, the exposure quantity of the second area 2 may be about 1.8 mJ to about 6 mJ, and for example, the exposure quantity of the second area 2 may be about 4 mJ. The width of the second area 2 may be about 6.5 μm. The second area 2 may form the pretilted angle between the pretilted angle formed by the first area 1 and the pretilted angle formed by the third area 3, in the second alignment layer 360 corresponding to the second area 2.

The open rate of the first area 4 in the first mask 510 may be about 100%, the exposure quantity of the first area 4 may be about 20 mJ, the width in the up and down direction of the first area 4 may be about 6.5 μm, and the first area 4 may form the pretilted angle about 2.0 degrees in the first alignment layer 270 in the horizontal domain boundary texture area WDBT which is the boundary between the first domain 100a and the fourth domain 100d.

The open rate of the third area 6 in the first mask 510 may be about 30%, the exposure quantity of the third area 6 may be about 6 mJ, the width in the up and down direction of the third area 6 may be calculated as subtracting the width of the first area 4 and the width of the second area 5 from the half-width of the pixel area, and the third area 6 may form the pretilted angle of about 1.2 degrees in the first alignment layer 270 in the first domain 100a.

The open rate of the second area 5 in the first mask 510 may be between the open rate of the first area 4 and the open rate of the third area 6. Thus, the open rate of the second area 5 may be about 30% to about 100%, and for example, the open rate of the second area 5 may be about 60%. The exposure quantity of the second area 5 may be between the exposure quantity of the first area 4 and the exposure quantity of the third area 6. Thus, the exposure quantity of the second area 5 may be about 6 mJ to about 20 mJ, and for example, the exposure quantity of the second area 5 may be about 14 mJ. The width of the second area 5 may be about 6.5 nm. The second area 5 may form the pretilted angle between the pretilted angle formed by the first area 4 and the pretilted angle formed by the third area 6, in the first alignment layer 270 corresponding to the second area 5.

The open rate of the third area 3 in the second mask 520 is about 10/3 (e.g., about 3.33) times larger than the open rate of the third area 6 in the first mask 510, and thus the exposing speed corresponding to the third area 6 in the first mask 510 is about 10/3 (e.g., about 3.33) times faster than the exposing speed corresponding to the third area 3 in the second mask 520.

The first mask 510 and the second mask 520 form the pretilted angles substantially same with each other in the first alignment layer 270 and the second alignment layer 360 corresponding to the first domain 100a. Thus, the liquid crystal disposed in the first domain 100a may have an angle of about 45 degrees with respect to an upper surface of the pixel electrode 260.

The second mask 520 controls the exposure quantity incident into the upper substrate 300 so that the exposure quantity incident into the boundary between the first domain 100a and the second domain 100b is less than the exposure quantity incident into the first domain 100a. In addition, the second mask 520 forms the pretilted angle in the second alignment layer 360 so that the pretilted angle between the first domain 100a and the second domain 100b is less than the pretilted angle in the first domain 100a. In addition, the pretilted angle in the second alignment layer 360 formed by the second mask 520 is less than the pretilted angle in the first alignment layer 270 formed by the first mask 270. Thus, the width of the vertical domain boundary texture area LDBT may be increased.

The first mask 510 controls the exposure quantity incident into the lower substrate 200 so that the exposure quantity incident into the boundary between the first domain 100a and the fourth domain 100d is larger than the exposure quantity incident into the first domain 100a. In addition, the first mask 510 forms the pretilted angle in the first alignment layer 270 so that the pretilted angle between the first domain 100a and the fourth domain 100d is larger than the pretilted angle in the first domain 100a. Thus, the width of the horizontal domain boundary texture area WDBT may decrease.

Exemplary embodiments of methods of forming the pretilted angle using the first mask 510 and the fourth mask 540, a method of forming the pretilted angle using the third mask 530 and the fourth mask 540, and a method of forming the pretilted angle using the third mask 530 and the second mask 520 are substantially the same as the method of forming the pretilted angle using the first mask 510 and the second mask 520, and thus any further repetitive explanation concerning the above elements will be omitted.

FIGS. 5A to 5E are cross-sectional views illustrating an exemplary embodiment of a method of manufacturing the display panel 100 of FIGS. 1 to 3 using the alignment mask of FIG. 4.

Figure 5A:
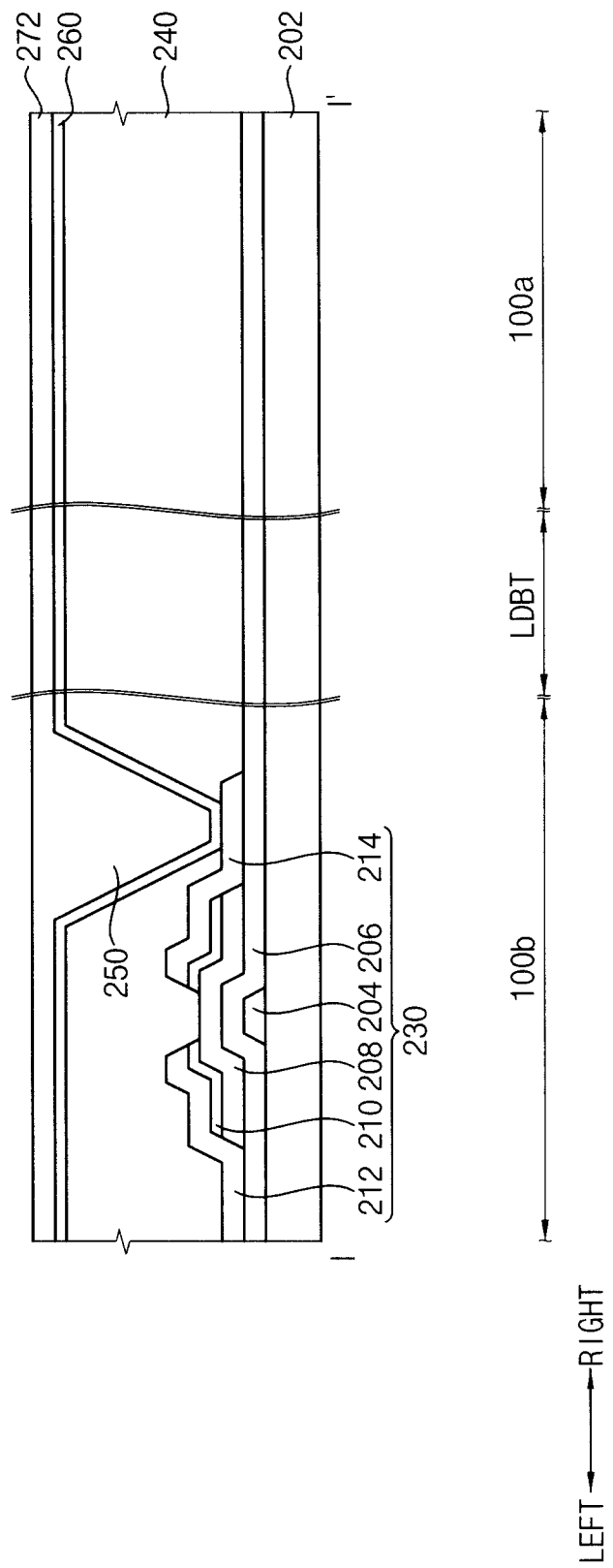

Referring to FIG. 5A, the gate lines GL, the data lines DL and the TFT 230 are formed on the first base substrate 202, the organic insulating layer 240 is formed on the TFT 230, the pixel electrode 260 electrically connected with the drain electrode 214 of the TFT 230 through the contact hole 250 is formed on the organic insulating layer 240, and the first alignment film 272 is formed on the pixel electrode 260.

Figure 5B:
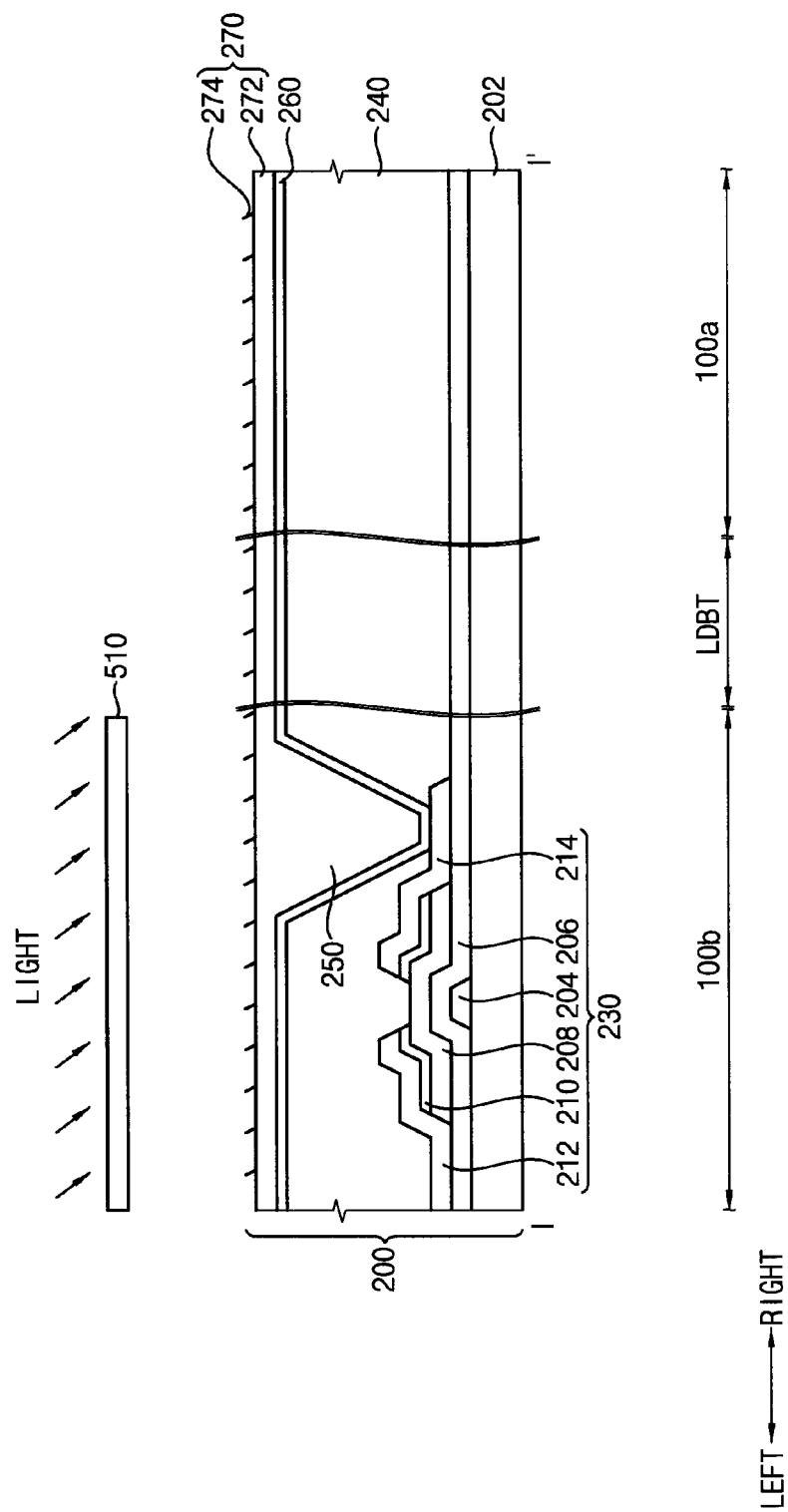

Referring to FIG. 5B, the light is incident into the first domain 100a, the second domain 100b and the horizontal domain boundary texture area WDBT through the first mask 510 in the first direction which is the left and right direction so that the pretilted angle is formed on the first light reactor 274 disposed on the first alignment film 272, to form the first alignment layer 270. The first mask 510 includes the first area 4 in which the open rate corresponding to the horizontal domain boundary texture area WDBT is about 100%, and the third area 6 in which the closed rate corresponding to the first domain 100a and the second domain 100b is larger than the open rate of the third area 6 corresponding to the first domain 100a and the second domain 100b.

In addition, although not shown in figures, the light is incident into the third domain 100c, the fourth domain 100d and the horizontal domain boundary texture area WDBT through the third mask 530 so that the pretilted angle is formed on the first light reactor 274 disposed on the first alignment film 272, to form the first alignment layer 270.

Figure 5C:
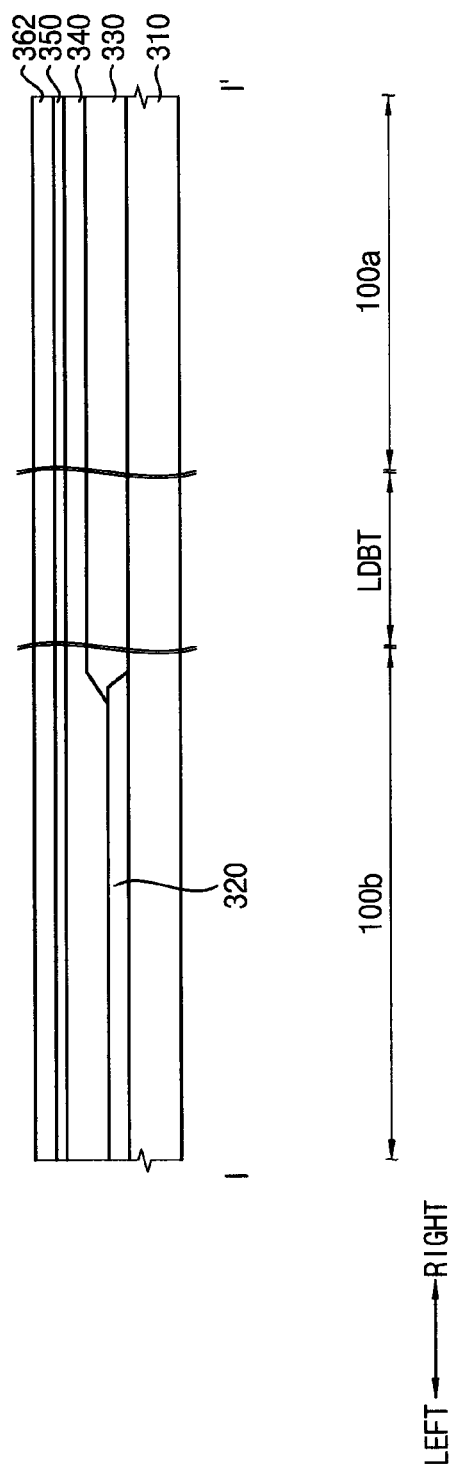

Referring to FIG. 5C, the light blocking portion 320 and the color filter 330 are formed on the second base substrate 310, the over-coating layer 340 is formed on the light blocking portion 320 and the color filter 330 is formed, the common electrode 350 is formed on the over-coating layer 340, and the second alignment film 362 is formed on the common electrode 350.

Figure 5D:
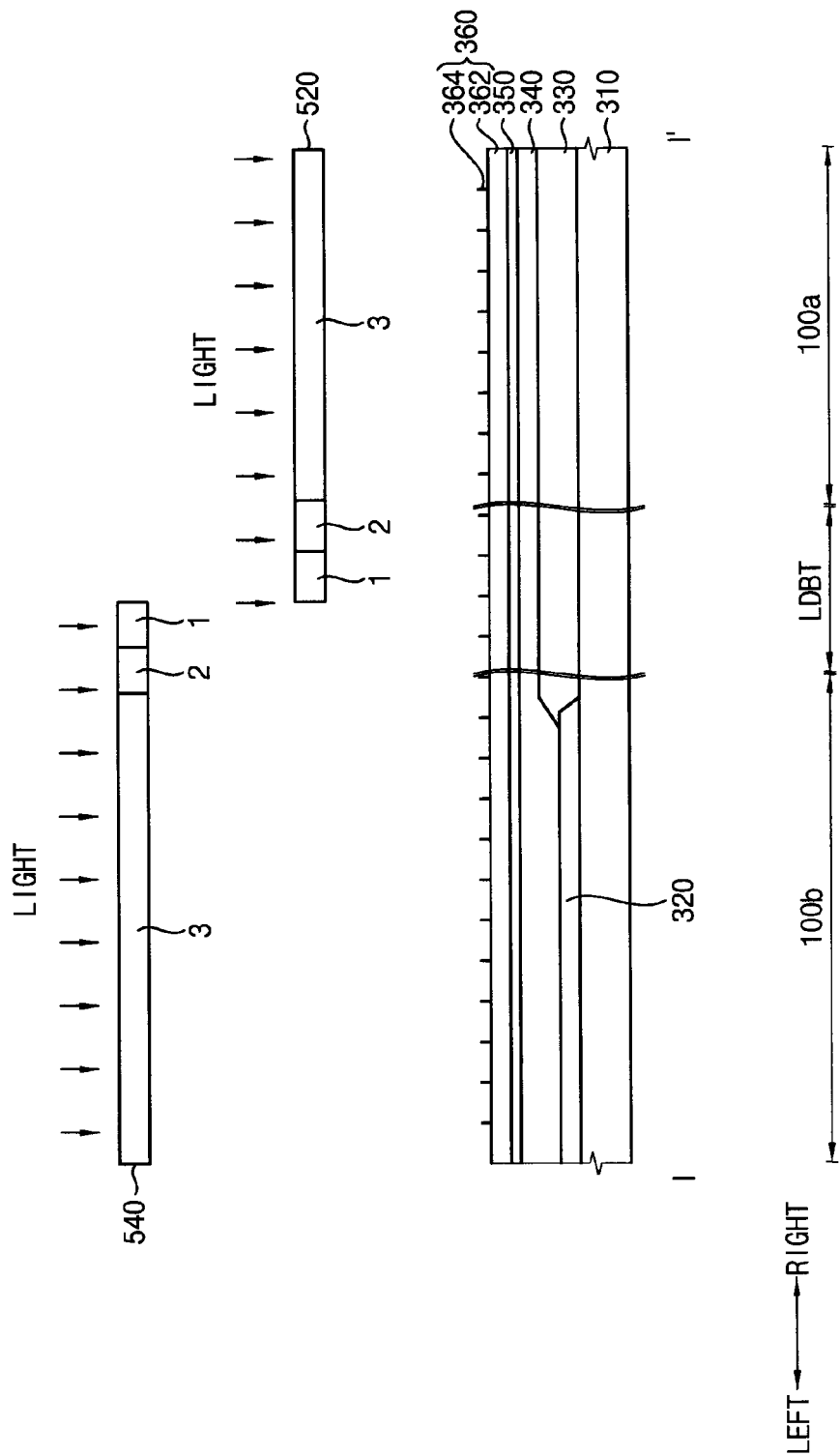

Referring to FIG. 5D, the light is incident into the first domain 100a and the vertical domain boundary texture area LDBT through the second mask 520 in the second direction which is the up and down direction so that the pretilted angle is formed on the second light reactor 364 disposed on the second alignment film 362, to form the second alignment layer 360. The second mask 520 includes the first area 1 in which the closed rate corresponding to the boundary between the first domain 100a and the second domain 100b is larger than the open rate corresponding to the boundary between the first domain 100a and the second domain 100b, and the third area 3 in which the open rate corresponding to the first domain 100a is about 100%. Thus, the pretilted angle of the second alignment layer 360 in the vertical domain boundary texture area LDBT is less than the pretilted angle of the second alignment layer 360 in the first domain 100a.

In the same manner like the second mask 520, the light is incident into the second domain 100b and the vertical domain boundary texture area LDBT through the fourth mask 540 so that the pretilted angle is formed on the second reactor 364 disposed on the second alignment film 362, to form the second alignment layer 360.

In addition, although not shown in figures, the light is incident into the third domain 100c and the fourth domain 100d through the second mask 520 and the fourth mask 540 so that the pretilted angle is formed on the second light reactor 364 disposed on the second alignment film 362, to form the second alignment layer 360.

Referring to FIG. 5E, the lower substrate 200 including the first light reactor 274 on which the pretilted angle is formed and the upper substrate 300 including the second light reactor 364 on which the pretilted angle is formed are combined with each other, and the liquid crystal layer 400 is disposed between the lower substrate 200 and the upper substrate 300 to align the liquid crystal of the liquid crystal layer 400. In the illustrated exemplary embodiment, for example, the first to fourth domains 100a, 100b, 100c and 100d having the matrix shape according to the slope of the liquid crystal are formed, the horizontal domain boundary texture area WDBT is formed longitudinally extending in the first direction which is the left and right direction at the boundary between the domains 100a, 100b, 100c and 100d adjacent to each other in the second direction which is the up and down direction, and the vertical domain boundary texture area LDBT is formed longitudinally extending in the second direction which is the up and down direction at the boundary between the domains 100a, 100b, 100c and 100d adjacent to each other in the first direction which is the left and right direction.

In the exemplary embodiment, the first mask 510 and the third mask 530 scan the lower substrate 200 in the left and right direction, and the second mask 520 and the fourth mask 540 scan the upper substrate 300 in the up and down direction, but not limited thereto. Alternatively, the first mask 510 and the third mask 530 scan the upper substrate 300 in the left and right direction so that the light is incident into the upper substrate, and the second mask 520 and the fourth mask 540 scan the lower substrate 200 in the up and down direction so that the light is incident into the lower substrate. In this case, the first alignment layer 270 may have the pretilted angle in the second direction which is substantially parallel with the data line DL and is the up and down direction, and the second alignment layer 360 may have the pretilted angle in the first direction which is substantially parallel with the gate line GL and is the left and right direction.

According to the exemplary embodiment, the second mask 520 and the fourth mask 540 scanning the upper substrate 300 in the up and down direction may increase the width of the vertical domain boundary texture area LDBT having the slope of the liquid crystal slowly (e.g., less) inclined compared to that of the first to fourth domains 100a, 100b, 100c and 100d. Thus, a side visibility of a display apparatus may be improved.

In addition, the first mask 510 and the third mask 530 scanning the lower substrate 200 in the left and right direction may decrease the width of the horizontal domain boundary texture area WDBT extending in the left and right direction and disposed in the boundary between the first to fourth domains 100a, 100b, 100c and 100d. Thus, a luminance of the display apparatus including the display panel 100 may be enhanced and a black afterimage may be less displayed on the display apparatus.

In addition, the first to fourth masks 510, 520, 530 and 540 form the pretilted angles substantially same with each other in the first alignment layer 270 and the second alignment layer 360 corresponding to the first to fourth domains 100a, 100b, 100c and 100d, and thus the liquid crystal of the liquid crystal layer 400 may have the angle of about 45 degrees with respect to the upper surface of the pixel electrode 260. Thus, a transmittance of the display apparatus including the display panel 100 may be enhanced.

Figure 6:
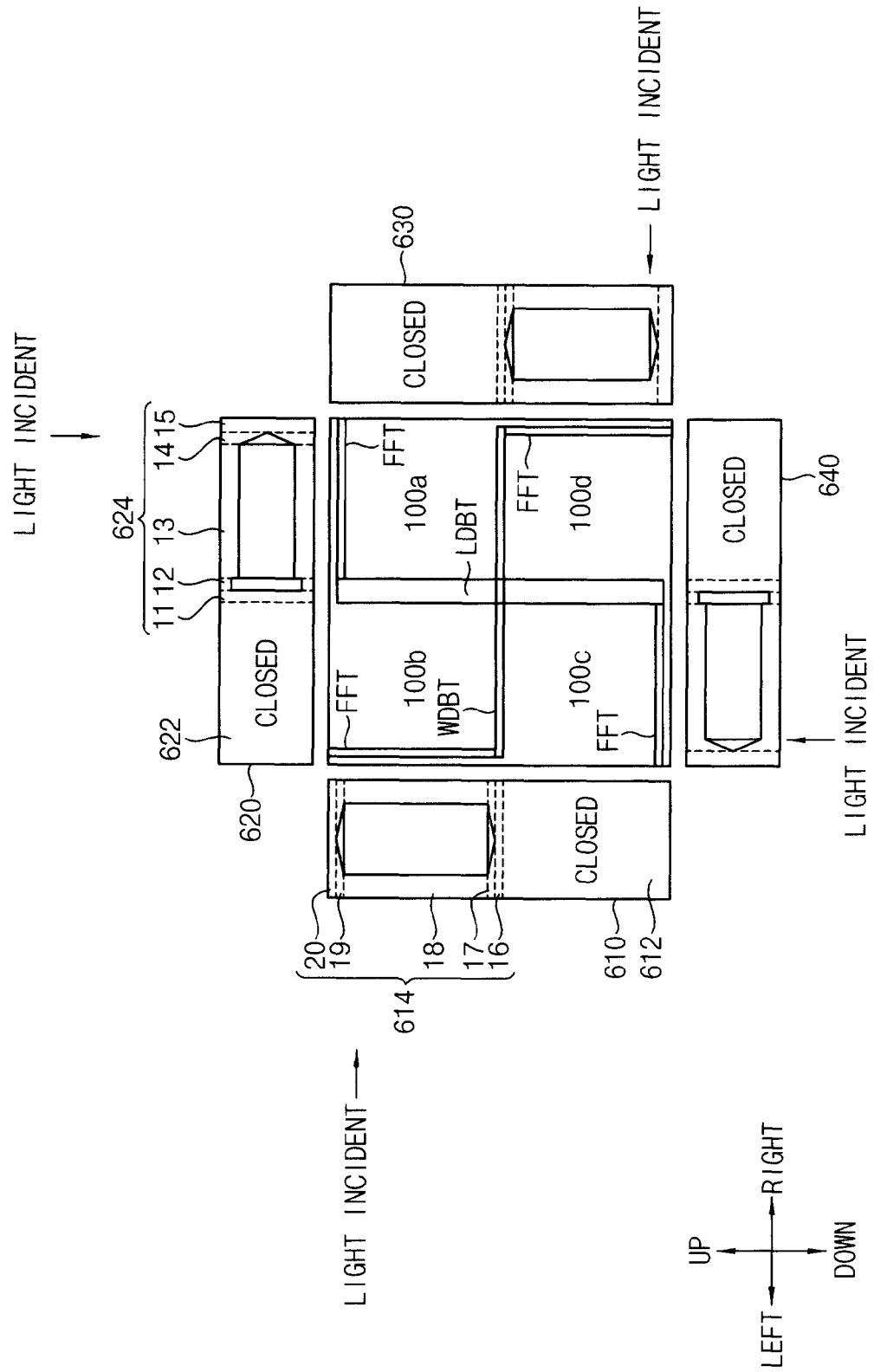
FIG. 6 is a plan view illustrating another exemplary embodiment of an alignment mask according to the invention.

FIG. 6 is a plan view illustrating another exemplary embodiment of an alignment mask according to the invention.

The alignment mask according to the exemplary embodiment may be used in manufacturing the display panel 100 illustrated in FIGS. 1 to 3. Thus, the same reference numerals will be used to refer to same or like parts as those described in the previous exemplary embodiment and any further repetitive explanation concerning the above elements will be omitted.

Referring to FIGS. 1 to 3 and 6, the alignment mask according to the example embodiment includes a first mask 610, a second mask 620, a third mask 630 and a fourth mask 640.

The first mask 610 scans the lower substrate 200 from the left direction to the right direction and the light is incident into the lower substrate 200, and the third mask 630 scans the lower substrate 200 from the right direction to the left direction and the light is incident into the lower substrate 200, and thus the pretilted angle is formed in the first alignment layer 270 on the lower substrate 200. The second mask 620 scans the upper substrate 300 from the up direction to the down direction and the light is incident into the upper substrate 300, and the fourth mask 640 scans the upper substrate 300 from the down direction to the up direction and the light is incident into the upper substrate 300, and thus the pretilted angle is formed in the second alignment layer 360 on the upper substrate 300. In one exemplary embodiment, for example, the light incident into the lower substrate 200 and the upper substrate 300 through the first to fourth masks 610, 620, 630 and 640 may be an ultraviolet ray.

The first mask 610 includes a closed area 612 and an open area 614. The closed area 612 corresponds to the third domain 100c and the fourth domain 100d in which the pretilted angle is not formed by the first mask 610. In one exemplary embodiment, for example, the closed area 612 may include chrome (Cr) material.

The open area 614 includes a first area 16, a second area 17, a third area 18, a fourth area 19 and a fifth area 20. The first area 16 corresponds to the boundary between the first domain 100a and the fourth domain 100d. Thus, the first area 16 corresponds to the horizontal domain boundary texture area WDBT. The first area 16 corresponding to the boundary between the first domain 100a and the fourth domain 100d is open. The third area 18 corresponds to the first domain 100a, and a closed rate of the third area 18 is larger than an open rate of the third area 18. The fifth area 20 corresponds to the adjacent electric field texture area FFT, and the fifth area 20 is open corresponding to the adjacent electric field texture area FFT. The second area 17 is disposed between the first area 16 and the third area 18, and has an open rate between an open rate of the first area 16 and the open rate of the third area. The fourth area 19 is disposed between the third area 18 and the fifth area 20, and the fourth area 19 has an open rate between the open rate of the third area 18 and an open rate of the fifth area 20.

The second mask 620 includes a closed area 622 and an open area 624. The closed area 622 corresponds to the second domain 100b and the third domain 100c in which the pretilted angle is not formed by the second mask 620. In one exemplary embodiment, for example, the closed area 622 may include chrome (Cr) material.

The open area 624 includes a first area 11, a second area 12, a third area 13, a fourth area 14 and a fifth area 15. The first area 16 corresponds to an area adjacent to the second domain 100b in the boundary between the first domain 100a and the second domain 100b. Thus, the first area 11 corresponds to the area adjacent to the second domain 100b in the vertical domain boundary texture area LDBT, and an open rate of the first area is about 100%. The second area 12 corresponds to an area adjacent to the first domain 100a in the boundary between the first domain 100a and the second domain 100b. Thus, the second area 12 corresponds to the area adjacent to the first domain 100a in the vertical domain boundary texture area LDBT, and a closed rate of the second area 12 is larger than an open rate of the second area 12. The third area 13 corresponds to the first domain 100a, and a closed rate of the third area 13 is larger than an open rate of the third area 13. The fifth area 15 corresponds to the adjacent electric field texture area FFT, and the fifth area 15 is open corresponding to the adjacent electric field texture area FFT. The fourth area 14 is disposed between the third area 13 and the fifth area 15, and the fourth area 14 has an open rate between the open rate of the third area 13 and an open rate of the fifth area 15.

In the exemplary embodiment, for example, the open rate, an exposure quantity in mJ, a width of the first mask 610 and the second mask 620 in μm, and the pretilted angle formed by the first mask 610 and the second mask 620 may be shown in Table 2.

TABLE 2

| classification | | open rate of mask | exposure quantity | width | pretilted angle |
|---|---|---|---|---|---|
| second mask 620 | first area 11 | 100% | 20 mJ | 6.5 um ± 1.5 um | 2.0 degrees (±0.3 degrees) |
| | second area 12 | 9% | 1.8 mJ | 6.5 um ± 1.5 um | less than 0.7 degrees |
| | third area 13 | 30% (~40%) | 6 mJ | ½ Pixel − (11 + 12 + 14 + 15) | 1.2 degrees (±0.3 degrees) |

TABLE 2-continued

| classification | | open rate of mask | exposure quantity | width | pretilted angle |
|---|---|---|---|---|---|
| first mask 610 | fourth area 14 | Between 13 & 15 | Between 13 & 15 | 3.0 um ± 1.5 um | Between 13 & 15 |
| | fifth area 15 | 100% | 20 mJ | 6.0 um ± 1.5 um | 2.0 degrees (±0.3 degrees) |
| | first area 16 | 100% | 20 mJ | 6.5 um ± 1.5 um | 2.0 degrees (±0.3 degrees) |
| | second area 17 | Between 16 & 18 | Between 16 & 18 | 6.5 um ± 1.5 um | Between 16 & 18 |
| | third area 18 | 30% (~40%) | 6 mJ | ½ Pixel – (16 + 17 + 19 + 20) | 1.2 degrees (±0.3 degrees) |
| | fourth area 19 | Between 18 & 20 | Between 18 & 20 | 3.0 um ± 1.5 um | Between 18 & 20 |
| | fifth area 20 | 100% | 20 mJ | 6.0 um ± 1.5 um | 2.0 degrees (±0.3 degrees) |

The open rate of the first area 11 in the second mask 620 may be about 100%, the exposure quantity of the first area 11 may be about 20 mJ, the width in the left and right direction of the first area 11 may be about 6.5 μm, and the first area 11 may form the pretilted angle of about 2.0 degrees in the second alignment layer 360 in the area adjacent to the second domain 100b in the boundary between the first domain 100a and the second domain 100b.

The open rate of the second area 12 in the second mask 620 may be about 9%, the exposure quantity of the second area 12 may be about 1.8 mJ, the width in the left and right direction of the second area 12 may be about 6.5 μm, and the second area 12 may form the pretilted angle less than about 0.7 degrees in the second alignment layer 360 in the area adjacent to the first domain 100a in the boundary between the first domain 100a and the second domain 100b.

The open rate of the third area 13 in the second mask 620 may be about 30%, the exposure quantity of the third area 13 may be about 6 mJ, the width of the third area 13 in the left and right direction may be calculated as subtracting the width of the first area 11, the width of the second area 12, the width of the fourth area 14 and the width of the fifth area 15 from the half-width of the pixel area, and the third area 13 may form the pretilted angle of about 1.2 degrees in the second alignment layer 360 in the first domain 100a.

The open rate of the fifth area 15 in the second mask 620 may be about 100%, the exposure quantity of the fifth area 15 may be about 20 mJ, the width in the left and right direction of the fifth area 15 may be about 6.0 μm, and the fifth area 15 may form the pretilted angle of about 2.0 degrees in the second alignment layer 360.

The open rate of the fourth area 14 in the second mask 620 may be between the open rate of the third area 13 and the open rate of the fifth area 15. Thus, the open rate of the fourth area 14 may be about 30% to about 100%, and for example, the open rate of the fourth area 14 may be about 60%. The exposure quantity of the fourth area 14 may be between the exposure quantity of the third area 13 and the exposure quantity of the fifth area 15. Thus, the exposure quantity of the fourth area 14 may be about 6 mJ to about 20 mJ, and for example, the exposure quantity of the fourth area 14 may be about 14 mJ. The width of the fourth area 14 may be about 3.0 μm. The fourth area 14 may form the pretilted angle between the pretilted angle formed by the third area 13 and the pretilted angle formed by the fifth area 15, in the second alignment layer 360 corresponding to the fourth area 14.

The open rate of the first area 16 in the first mask 610 may be about 100%, the exposure quantity of the first area 16 may be about 20 mJ, the width in the up and down direction of the first area 16 may be about 6.5 μm, and the first area 16 may form the pretilted angle of about 2.0 degrees in the horizontal domain boundary texture area WDBT which is the boundary between the first domain 100a and the fourth domain 100d.

The open rate of the third area 18 in the first mask 610 may be about 30%, the exposure quantity of the third area 18 may be about 6 mJ, the width of the third area 18 in the up and down direction may be calculated as subtracting the width of the first area 16, the width of the second area 17, the width of the fourth area 19 and the width of the fifth area 20 from the half-width of the pixel area, and the third area 18 may form the pretilted angle of about 1.2 degrees in the first alignment layer 270 in the first domain 100a.

The open rate of the fifth area 20 in the first mask 610 may be about 100%, the exposure quantity of the fifth area 20 may be about 20 mJ, the width in the up and down direction of the fifth area 20 may be about 6.0 μm, and the fifth area 20 may form the pretilted angle of about 2.0 degrees in the first alignment layer 270.

The open rate of the second area 17 in the first mask 610 may be between the open rate of the first area 16 and the open rate of the third area 18. Thus, the open rate of the second area 17 may be about 30% to about 100%, and for example, the open rate of the second area 17 may be about 60%. The exposure quantity of the second area 17 may be between the exposure quantity of the first area 16 and the exposure quantity of the third area 18. Thus, the exposure quantity of the second area 17 may be about 6 mJ to about 20 mJ, and for example, the exposure quantity of the second area 17 may be about 14 mJ. The width of the second area 17 may be about 6.5 μm. The second area 17 may form the pretilted angle between the pretilted angle formed by the first area 16 and the pretilted angle formed by the third area 18, in the first alignment layer 270 corresponding to the second area 17. In one exemplary embodiment, for example, the second area 17 may form the pretilted angle of about 1.6 degrees in the first alignment layer 270.

The open rate of the fourth area 19 in the first mask 610 may be between the open rate of the third area 18 and the open rate of the fifth area 20. Thus, the open rate of the fourth area 19 may be about 30% to about 100%, and for example, the open rate of the fourth area 19 may be about 60%. The exposure quantity of the fourth area 19 may be between the exposure quantity of the third area 18 and the exposure quantity of the fifth area 20. Thus, the exposure quantity of the fourth area 19 may be about 6 mJ to about 20 mJ, and for example, the exposure quantity of the fourth area 19 may be about 14 mJ. The width of the fourth area 19 may be about 3.0 μm. The fourth area 19 may form the pretilted angle between the pretilted angle formed by the third area 18 and the pretilted angle formed by the fifth area 20, in the first alignment layer 270 corresponding to the fourth area 19.

FIGS. 7A to 7E are cross-sectional views illustrating an exemplary embodiment of a method of manufacturing the display panel 100 of FIGS. 1 to 3 using the alignment mask of FIG. 6.

Figure 7A:
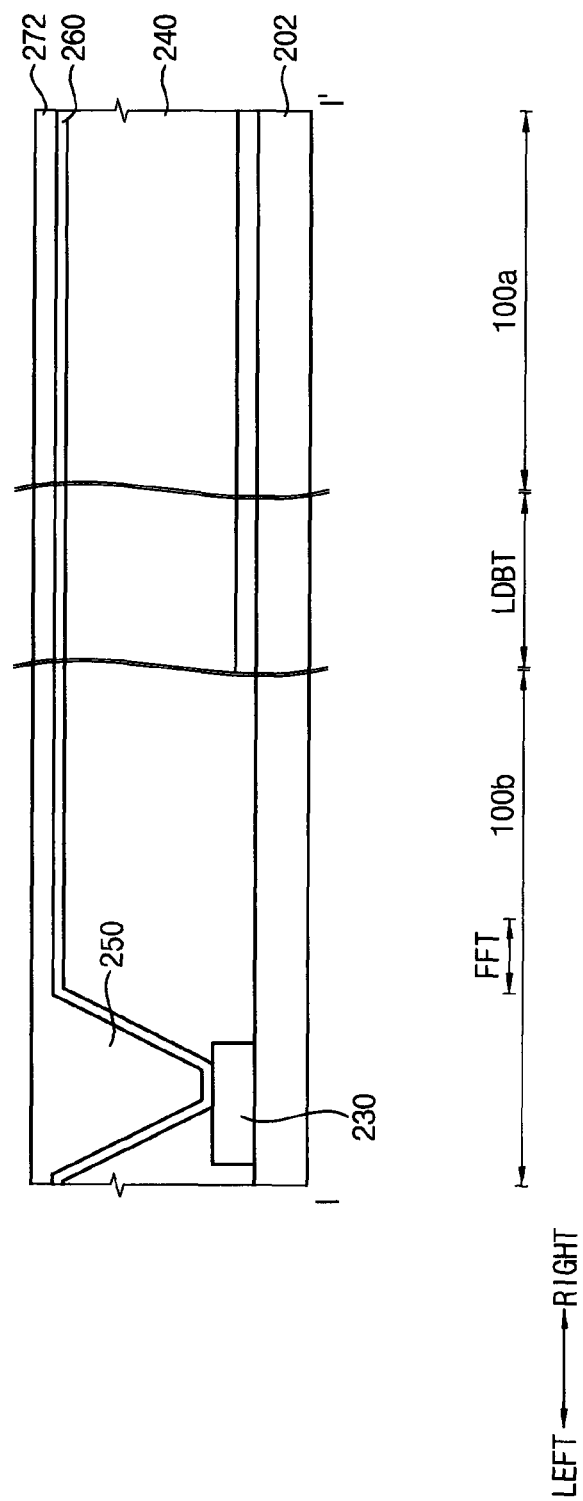

Referring to FIG. 7A, the gate lines GL, the data lines DL and the TFT 230 are formed on the first base substrate 202, the organic insulating layer 240 is formed on the TFT 230, the pixel electrode 260 electrically connected with the drain electrode 214 of the TFT 230 through the contact hole 250 is formed on the organic insulating layer 240, and the first alignment film 272 is formed on the pixel electrode 260.

Figure 7B:
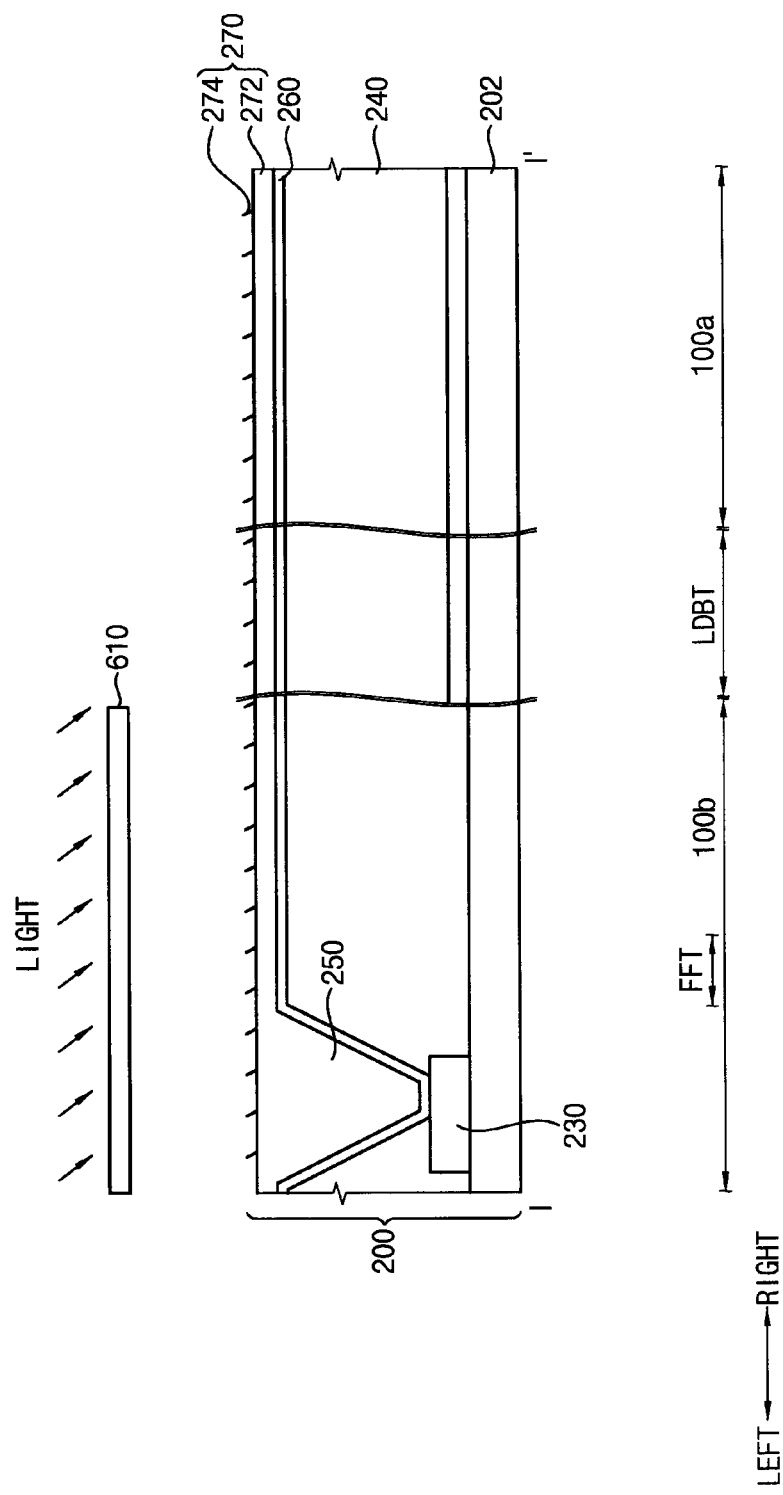

Referring to FIG. 7B, the light is incident into the first domain 100a, the second domain 100b and the horizontal domain boundary texture area WDBT through the first mask 610 so that the pretilted angle is formed on the first light reactor 274 disposed on the first alignment film 272, to form the first alignment layer 270. The first mask 610 includes the first area 16 in which the open rate corresponding to the horizontal domain boundary texture area WDBT is about 100%, the third area 18 in which the closed rate corresponding to the first domain 100a and the second domain 100b is larger than the open rate of the third area 18 corresponding to the first domain 100a and the second domain 100b, and the fifth area 20 in which the open rate corresponding to the adjacent electric field texture area FFT is about 100%.

Figure 7C:
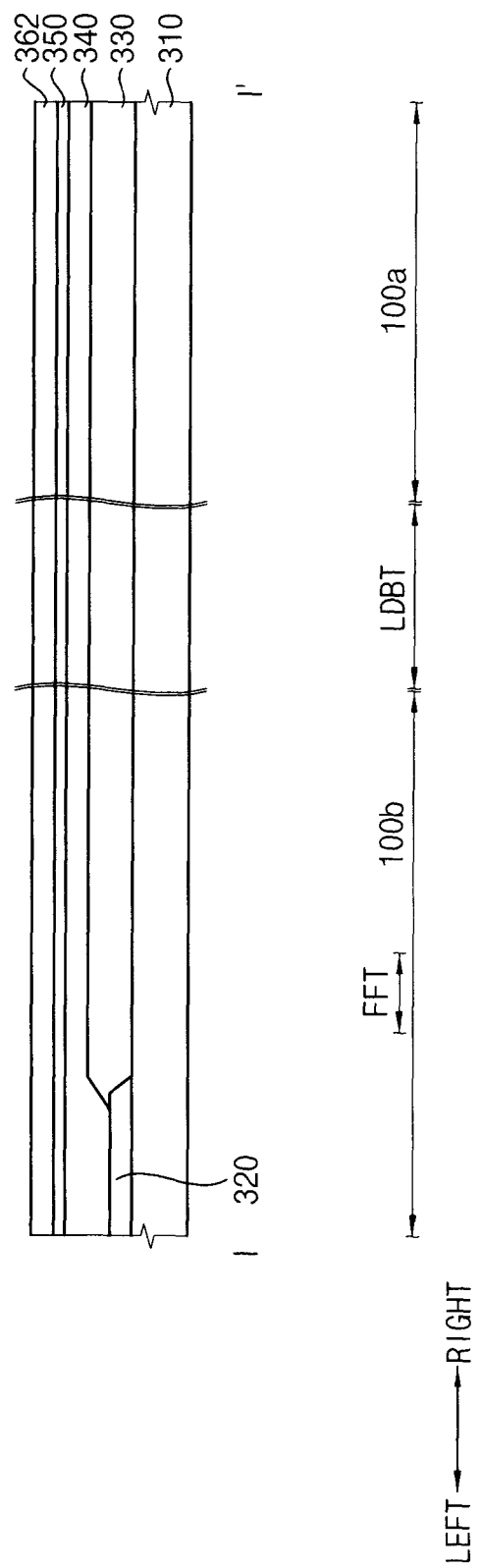

Referring to FIG. 7C, the light blocking portion 320 and the color filter 330 are formed on the second base substrate 310, the over-coating layer 340 is formed on the light blocking portion 320 and the color filter 330, the common electrode 350 is formed on the over-coating layer 340, and the second alignment film 362 is formed on the common electrode 350.

Referring to FIG. 7D, the light is incident into the first domain 100a and the vertical domain boundary texture area LDBT through the second mask 620 so that the pretilted angle is formed on the second light reactor 364 disposed on the second alignment film 362, to form the second alignment layer 360. The second mask 620 includes the first area 11 in which the open rate corresponding to a first portion of the vertical domain boundary texture area LDBT is about 100%, and the second area 12 in which the closed rate corresponding to a second portion of the vertical domain boundary texture area LDBT is larger than the open rate corresponding to the second portion of the vertical domain boundary texture area LDBT. In addition, although not shown in figures, the second mask 620 includes the fifth area 15 in which the open rate corresponding to the adjacent electric field texture area FFT in the fourth domain 100d is about 100%.

In the same manner like the second mask 620, the light is incident into the second domain 100b and the vertical domain boundary texture area LDBT through the fourth mask 640 and the pretilted angle is formed on the second reactor 364 disposed on the second alignment film 362, to form the second alignment layer 360. The fourth mask 640 includes the fifth area 15 in which the open rate corresponding to the adjacent electric field texture area FFT in the second domain 100b is about 100%.

Referring to FIG. 7E, the lower substrate 200 including the first light reactor 274 on which the pretilted angle is formed and the upper substrate 300 including the second light reactor 364 on which the pretilted angle is formed are combined with each other, and the liquid crystal layer 400 is disposed between the lower substrate 200 and the upper substrate 300 to align the liquid crystal of the liquid crystal layer 400.

According to the exemplary embodiment, the second mask 620 includes the first area 11 in which the open rate corresponding to the first portion of the vertical domain boundary texture area LDBT is about 100%. In addition, the first mask 610 includes the fifth area 20 in which the open rate corresponding to the adjacent electric field texture area FFT is about 100%, and the second mask 620 includes the fifth area 15 in which the open rate corresponding to the adjacent electric field texture area FFT is about 100%. Thus, the pretilted angle of the second alignment layer 360 in the vertical domain boundary texture area LDBT and the adjacent electric field texture area FFT is larger than the pretilted angle of the second alignment layer 360 in the first domain 100a. Thus, a tunk defect occurring when the liquid crystal is not restored after an external pressure is applied to the display apparatus including the display panel 100 may decrease.

According to the display panel, the method of manufacturing the display panel, and the alignment mask for manufacturing the display panel, a width of a vertical domain boundary texture area in which a liquid crystal is slowly (e.g., less) inclined along a left and right direction substantially parallel with a gate line may be increased, and thus a side visibility of a display apparatus may be improved. In addition, a width of a horizontal domain boundary texture area in which the liquid crystal is slowly (e.g., less) inclined along an up and down direction substantially parallel with a data line may be decreased, and thus a black afterimage may be less displayed on the display apparatus. Thus, display quality of the display apparatus may be enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
    a lower substrate comprising a gate line which extends in a first direction, a data line which extends in a second direction substantially perpendicular to the first direction, a pixel electrode adjacent to the gate line and the data line and overlapping a pixel area of the display panel in a plan view, and a first alignment layer on the pixel electrode;
    an upper substrate which faces the lower substrate, and comprises a common electrode, and a second alignment layer on the common electrode, wherein the common electrode is configured to form an electric field with the pixel electrode; and
    a liquid crystal layer between the lower substrate and the upper substrate,
    wherein the pixel area comprises a plurality of domains, a longitudinal domain boundary texture area disposed between the domains along the first direction, and a transverse domain boundary texture area disposed between the domains along the second direction, wherein pretilted angles of the first and the second alignment layers in the domains with respect to a surface parallel with one of the substrates are different from pretilted angles of the first and the second alignment layers with respect to the surface in both of the longitudinal domain boundary texture area and the transverse domain boundary texture area, and wherein a width of the longitudinal domain boundary texture area along the first direction is greater than a width of the transverse domain boundary texture area along the second direction.

2. The display panel of claim 1, wherein
the pretilted angle of the second alignment layer with respect to a surface parallel with the upper substrate is less than the pretilted angle of the first alignment layer with respect to a surface parallel with the lower substrate in the longitudinal domain boundary texture area.

3. The display panel of claim 1, wherein the pretilted angle of the second alignment layer in the longitudinal domain boundary texture area with respect to a surface parallel with the upper substrate is less than the pretilted angle of the second alignment layer in the domains with respect to the surface parallel with the upper substrate.

4. The display panel of claim 1, wherein the pretilted angle of the first alignment layer in the transverse domain boundary texture area with respect to a surface parallel with the lower substrate is greater than the pretilted angle of the first alignment layer in the domains with respect to the surface parallel with the lower substrate.

5. The display panel of claim 1, wherein a pretilted angle of the first alignment layer with respect to a surface parallel with the lower substrate is substantially equal to a pretilted angle of the second alignment layer with respect to a surface parallel with the upper substrate, in the domains.

6. The display panel of claim 1, wherein liquid crystals in the liquid crystal layer are configured to incline by an angle of about 45 degrees with respect to the surface, in the domains.

7. The display panel of claim 1, wherein liquid crystals in the liquid crystal layer are configured to incline by an angle less than about 45 degrees with respect to the surface, in the longitudinal domain boundary texture area.

8. The display panel of claim 1, wherein
the pixel area further comprises an adjacent electric field texture area in which a texture is configured to be formed in a portion of the pixel area adjacent to another pixel area along the first or second direction, and
pretilted angles of the first and second alignment layers in the adjacent electric field texture area with respect to the surface are greater than the pretilted angles of the first and second alignment layers in the domains with respect to the surface.

9. The display panel of claim 1, wherein
the pretilted angle of the first alignment layer with respect to a surface parallel with the lower substrate is less than the pretilted angle of the second alignment layer with respect to a surface parallel with the upper substrate in the longitudinal domain boundary texture area.

10. The display panel of claim 9, wherein the pretilted angle of the first alignment layer in the longitudinal domain boundary texture area with respect to the surface parallel to the lower substrate is less than the pretilted angle of the first alignment layer in the domains with respect to the surface parallel to the lower substrate.

11. A method of manufacturing a display panel, the method comprising:
forming a gate line, a data line and a pixel electrode on a first base substrate, and forming a first alignment layer on the pixel electrode,
wherein the gate line extends in a first direction, the data line extends in a second direction substantially perpendicular to the first direction, and the pixel electrode overlaps a pixel area of the display panel in a plan view and is adjacent to the gate line and the data line;
forming a common electrode on a second base substrate and forming a second alignment layer on the common electrode, wherein the common electrode is configured to form an electric field with the pixel electrode; and
interposing a liquid crystal layer between the first alignment layer on the first base substrate and the second alignment layer on the second base substrate,
wherein the pixel area comprises a plurality of domains, a longitudinal domain boundary texture area disposed between the domains along the first direction, and a transverse domain boundary texture area disposed between the domains along the second direction,
wherein pretilted angles of the first and the second alignment layers in the domains with respect to a surface parallel with one of the substrates are different from pretilted angles of the first and the second alignment layers with respect to the surface in both of the longitudinal domain boundary texture area and the transverse domain boundary texture area, and
wherein a width of the longitudinal domain boundary texture area along the first direction is greater than a width of the transverse domain boundary texture area along the second direction.

12. The method of claim 11, further comprising:
irradiating light on the first alignment layer, in the first direction, using a first mask including an open area which corresponds to the transverse domain boundary texture area.

13. The method of claim 12, further comprising:
irradiating light on the second alignment layer, in the second direction, using a second mask of which an area corresponding to the longitudinal domain boundary texture area and has a proportion of a closed area greater than a proportion an open area, with respect to a total of the closed and open areas of the second mask.

14. The method of claim 11, further comprising:
irradiating light on the second alignment layer, in the first direction, using a first mask including an open area which corresponds to the transverse domain boundary texture area.

15. The method of claim 14, further comprising:
irradiating light on the first alignment layer, in the second direction, using a second mask of which an area corresponding to the longitudinal domain boundary texture area has a proportion of a closed area greater than a proportion of an open area, with respect to a total of the closed and open areas of the second mask.

16. An alignment mask comprising:
a first mask which is configured to align a first alignment layer on an upper substrate of a display panel, the first mask including a first area which is open and corresponds to a transverse domain boundary texture area between a plurality of domains along a first direction in a pixel area of the display panel; and
a second mask which is configured to align a second alignment layer on a lower substrate of the display panel, the second mask including a second area which corresponds to a longitudinal domain boundary texture area between the domains along a second direction substantially perpendicular to the first direction in the pixel area, wherein the second direction is substantially parallel with a direction in which a gate line of the display panel extends, and the transverse domain boundary texture area is substantially parallel with the second direction, wherein the second area has a proportion of a closed area greater than a proportion of an open area, with respect to a total of the closed and open areas of the second mask, and wherein the first direction is substantially parallel with a direction in which a data line of the display panel extends, and the longitudinal domain boundary texture area is substantially parallel with the first direction.

17. The alignment mask of claim 16, wherein
a proportion of the open area with respect to a total of closed and open areas at the first area is about 100%.

18. The alignment mask of claim 17, wherein the proportion of the open area at the second area is less than a proportion of the open area at a portion of the second mask corresponding to one of the domains.

19. The alignment mask of claim 16, wherein
the first mask and the second mask have open areas corresponding to an adjacent electric field texture area of the pixel area.

* * * * *